(12) United States Patent
Kesseli et al.

(10) Patent No.: US 9,051,873 B2
(45) Date of Patent: Jun. 9, 2015

(54) CERAMIC-TO-METAL TURBINE SHAFT ATTACHMENT

(75) Inventors: James B. Kesseli, Greenland, NH (US); James S. Nash, North Hampton, NH (US)

(73) Assignee: ICR Turbine Engine CorporationNH (US)

( * ) Notice: Subject to any disclaimer, the term of this patent is extended or adjusted under 35 U.S.C. 154(b) by 582 days.

(21) Appl. No.: 13/476,754

(22) Filed: May 21, 2012

(65) Prior Publication Data

US 2014/0196457 A1 Jul. 17, 2014

Related U.S. Application Data

(60) Provisional application No. 61/488,575, filed on May 20, 2011.

(51) Int. Cl.
| | |
|---|---|
| *F02B 73/00* | (2006.01) |
| *F01D 5/02* | (2006.01) |
| F01D 25/16 | (2006.01) |
| F01D 11/18 | (2006.01) |
| F01D 5/06 | (2006.01) |
| F01D 19/02 | (2006.01) |

(52) U.S. Cl.
CPC .................. *F02B 73/00* (2013.01); *F01D 25/16* (2013.01); *F01D 5/026* (2013.01); *F01D 11/18* (2013.01); *F01D 5/063* (2013.01); *F01D 5/022* (2013.01); *F01D 19/02* (2013.01); *Y02E 50/12* (2013.01)

(58) Field of Classification Search
CPC ......... F01D 5/022; F01D 5/026; F01D 5/063; F01D 11/18; F01D 19/02; F01D 25/16; F02B 73/00
See application file for complete search history.

(56) References Cited

U.S. PATENT DOCUMENTS

| | | |
|---|---|---|
| 2,463,964 A | 3/1949 | Graf |
| 2,543,677 A | 2/1951 | Traupel |
| 2,696,711 A | 12/1954 | Marchant et al. |

(Continued)

FOREIGN PATENT DOCUMENTS

| | | |
|---|---|---|
| AT | 311027 | 12/2005 |
| AU | 582981 | 4/1989 |

(Continued)

OTHER PUBLICATIONS

U.S. Appl. No. 13/210,121, filed Aug. 15, 2011, Donnelly et al.

(Continued)

*Primary Examiner* — Igor Kershteyn
(74) *Attorney, Agent, or Firm* — Sheridan Ross P.C.

(57) ABSTRACT

A metallic-ceramic joint for a turbo-compressor spool is disclosed. A temperature-limited joint is moved from outside the bearings to between the bearings and near the center of the shaft joining the turbine and compressor. This placement can lower the temperature at and around the joint and reduces the sharp gradient (and associated thermal stress) naturally occurring between the turbine rotor and the cooler joint. The bearing closest to the compressor can be an oil bearing and the bearing closest to the turbine an air bearing. The bearing closest to the compressor and the bearing closest to the turbine can both be an oil bearing. The bearing closest to the compressor and the bearing closest to the turbine can both be an air bearing. Moving the metallic-ceramic joint between the bearings can provide sufficient isolation to enable the all-air bearing solution.

28 Claims, 8 Drawing Sheets

(56) References Cited

U.S. PATENT DOCUMENTS

| | | |
|---|---|---|
| 2,711,071 A | 6/1955 | Frankel |
| 3,032,987 A | 5/1962 | Taylor |
| 3,091,933 A | 6/1963 | Wagner et al. |
| 3,166,902 A | 1/1965 | Maljanian et al. |
| 3,204,406 A | 9/1965 | Howes et al. |
| 3,209,536 A | 10/1965 | Howes et al. |
| 3,237,404 A | 3/1966 | Flanigan et al. |
| 3,283,497 A | 11/1966 | Kaplan |
| 3,319,931 A | 5/1967 | Bell, III |
| 3,518,472 A | 6/1970 | O'Callaghan |
| 3,623,318 A | 11/1971 | Shank |
| 3,639,076 A | 2/1972 | Rowen |
| 3,646,753 A | 3/1972 | Stearns et al. |
| 3,660,977 A | 5/1972 | Reynolds |
| 3,706,203 A | 12/1972 | Goldberg et al. |
| 3,729,928 A | 5/1973 | Rowen |
| 3,748,491 A | 7/1973 | Barrigher et al. |
| 3,764,814 A | 10/1973 | Griffith |
| 3,766,732 A | 10/1973 | Woodcock |
| 3,817,343 A | 6/1974 | Albrecht |
| 3,831,374 A | 8/1974 | Nicita |
| 3,848,636 A | 11/1974 | McCombs |
| 3,866,108 A | 2/1975 | Yannone et al. |
| 3,888,337 A | 6/1975 | Worthen et al. |
| 3,893,293 A | 7/1975 | Moore |
| 3,937,588 A | 2/1976 | Kisslan |
| 3,939,653 A | 2/1976 | Schirmer |
| 3,945,199 A | 3/1976 | Bradley et al. |
| 3,953,967 A | 5/1976 | Smith |
| 3,964,253 A | 6/1976 | Paduch et al. |
| 3,977,183 A | 8/1976 | Stearns |
| 3,986,364 A | 10/1976 | Cronin et al. |
| 3,986,575 A | 10/1976 | Eggmann |
| 3,999,373 A | 12/1976 | Bell et al. |
| 3,999,375 A | 12/1976 | Smith et al. |
| 4,002,058 A | 1/1977 | Wolfinger |
| 4,005,946 A | 2/1977 | Brown et al. |
| 4,027,472 A | 6/1977 | Stearns |
| 4,027,473 A | 6/1977 | Baker |
| 4,056,019 A | 11/1977 | Ahlen |
| 4,059,770 A | 11/1977 | Mackay |
| 4,067,189 A | 1/1978 | Earnest |
| 4,082,115 A | 4/1978 | Gibb et al. |
| 4,122,668 A | 10/1978 | Chou et al. |
| 4,242,042 A | 12/1980 | Schwarz |
| 4,242,871 A | 1/1981 | Breton |
| 4,248,040 A | 2/1981 | Kast |
| 4,270,357 A | 6/1981 | Rossi et al. |
| 4,276,744 A | 7/1981 | Pisano |
| 4,277,938 A | 7/1981 | Belke et al. |
| 4,280,327 A | 7/1981 | Mackay |
| 4,282,948 A | 8/1981 | Jerome |
| 4,312,191 A | 1/1982 | Biagini |
| 4,336,856 A | 6/1982 | Gamell |
| 4,399,651 A | 8/1983 | Geary et al. |
| 4,411,595 A | 10/1983 | Pisano |
| 4,449,359 A | 5/1984 | Cole et al. |
| 4,467,607 A | 8/1984 | Rydquist et al. |
| 4,470,261 A | 9/1984 | Kronogard et al. |
| 4,474,007 A | 10/1984 | Kronogard et al. |
| 4,492,874 A | 1/1985 | Near |
| 4,494,372 A | 1/1985 | Cronin |
| 4,499,756 A | 2/1985 | Medeiros et al. |
| 4,509,333 A | 4/1985 | Nussdorfer et al. |
| 4,529,887 A | 7/1985 | Johnson |
| 4,586,337 A | 5/1986 | Fox |
| 4,754,607 A | 7/1988 | Mackay |
| 4,783,957 A | 11/1988 | Harris |
| 4,815,278 A | 3/1989 | White |
| 4,819,436 A | 4/1989 | Ahner et al. |
| 4,858,428 A | 8/1989 | Paul |
| 4,864,811 A | 9/1989 | Pfefferle |
| 5,010,729 A | 4/1991 | Adamson et al. |
| 5,036,267 A | 7/1991 | Markunas et al. |
| 5,069,032 A | 12/1991 | White |
| 5,081,832 A | 1/1992 | Mowill |
| 5,083,039 A | 1/1992 | Richardson et al. |
| 5,090,193 A | 2/1992 | Schwarz et al. |
| 5,097,658 A | 3/1992 | Klaass et al. |
| 5,113,669 A | 5/1992 | Coffinberry |
| 5,129,222 A | 7/1992 | Lampe et al. |
| 5,144,299 A | 9/1992 | Smith |
| 5,181,827 A | 1/1993 | Pellow et al. |
| 5,214,910 A | 6/1993 | Adair |
| 5,231,822 A | 8/1993 | Shekleton |
| 5,253,470 A | 10/1993 | Newton |
| 5,276,353 A | 1/1994 | Kobayashi et al. |
| 5,301,500 A | 4/1994 | Hines |
| 5,329,757 A | 7/1994 | Faulkner et al. |
| 5,333,989 A | 8/1994 | Missana et al. |
| 5,343,692 A | 9/1994 | Thomson et al. |
| 5,349,814 A | 9/1994 | Ciokajlo et al. |
| 5,386,688 A | 2/1995 | Nakhamkin |
| 5,427,455 A | 6/1995 | Bosley |
| 5,448,889 A | 9/1995 | Bronicki |
| 5,450,724 A | 9/1995 | Kesseli et al. |
| 5,488,823 A | 2/1996 | Faulkner et al. |
| 5,497,615 A | 3/1996 | Noe et al. |
| 5,529,398 A | 6/1996 | Bosley |
| 5,549,174 A | 8/1996 | Reis |
| 5,555,719 A | 9/1996 | Rowen et al. |
| 5,564,270 A | 10/1996 | Kesseli et al. |
| 5,586,429 A | 12/1996 | Kesseli et al. |
| 5,609,655 A | 3/1997 | Kesseli et al. |
| 5,610,962 A | 3/1997 | Solorzano et al. |
| 5,625,243 A | 4/1997 | Lindgren et al. |
| 5,667,358 A | 9/1997 | Gaul |
| 5,685,156 A | 11/1997 | Willis et al. |
| 5,697,848 A | 12/1997 | Bosley |
| 5,722,259 A | 3/1998 | Sorensen et al. |
| 5,742,515 A | 4/1998 | Runkle et al. |
| 5,752,380 A | 5/1998 | Bosley et al. |
| 5,784,268 A | 7/1998 | Steffek et al. |
| 5,791,868 A | 8/1998 | Bosley et al. |
| 5,819,524 A | 10/1998 | Bosley et al. |
| 5,820,074 A | 10/1998 | Trommer et al. |
| 5,827,040 A | 10/1998 | Bosley et al. |
| 5,850,732 A | 12/1998 | Willis et al. |
| 5,850,733 A | 12/1998 | Bosley et al. |
| 5,855,112 A | 1/1999 | Bannai et al. |
| 5,873,235 A | 2/1999 | Bosley et al. |
| 5,894,720 A | 4/1999 | Willis et al. |
| 5,899,673 A | 5/1999 | Bosley et al. |
| 5,903,116 A | 5/1999 | Geis et al. |
| 5,915,841 A | 6/1999 | Weissert |
| 5,918,985 A | 7/1999 | Bosley |
| 5,928,301 A | 7/1999 | Soga et al. |
| 5,929,538 A | 7/1999 | O'Sullivan et al. |
| 5,954,174 A | 9/1999 | Costin |
| 5,964,663 A | 10/1999 | Stewart et al. |
| 5,966,926 A | 10/1999 | Shekleton et al. |
| 5,983,986 A | 11/1999 | Macintyre et al. |
| 5,983,992 A | 11/1999 | Child et al. |
| 5,992,139 A | 11/1999 | Kesseli |
| 6,002,603 A | 12/1999 | Carver |
| 6,011,377 A | 1/2000 | Heglund et al. |
| 6,016,658 A | 1/2000 | Willis et al. |
| 6,020,713 A | 2/2000 | Geis et al. |
| 6,023,135 A | 2/2000 | Gilbreth et al. |
| 6,031,294 A | 2/2000 | Geis et al. |
| 6,037,687 A | 3/2000 | Stewart et al. |
| 6,049,195 A | 4/2000 | Geis et al. |
| 6,062,016 A | 5/2000 | Edelman |
| 6,065,281 A | 5/2000 | Shekleton et al. |
| 6,070,404 A | 6/2000 | Bosley et al. |
| 6,082,112 A | 7/2000 | Shekleton |
| 6,085,524 A | 7/2000 | Persson |
| 6,093,975 A | 7/2000 | Peticolas |
| 6,094,799 A | 8/2000 | Stewart et al. |
| 6,098,397 A | 8/2000 | Glezer et al. |
| 6,107,693 A | 8/2000 | Mongia et al. |
| 6,138,781 A | 10/2000 | Hakala |
| D433,997 S | 11/2000 | Laituri et al. |
| 6,141,953 A | 11/2000 | Mongia et al. |

(56) References Cited

U.S. PATENT DOCUMENTS

| | | |
|---|---|---|
| 6,155,076 A | 12/2000 | Cullen et al. |
| 6,155,780 A | 12/2000 | Rouse |
| 6,158,892 A | 12/2000 | Stewart et al. |
| 6,169,334 B1 | 1/2001 | Edelman |
| 6,170,251 B1 | 1/2001 | Skowronski et al. |
| 6,178,751 B1 | 1/2001 | Shekleton et al. |
| 6,190,048 B1 | 2/2001 | Weissert |
| 6,192,668 B1 | 2/2001 | Mackay |
| 6,194,794 B1 | 2/2001 | Lampe et al. |
| 6,205,765 B1 | 3/2001 | Iasillo et al. |
| 6,205,768 B1 | 3/2001 | Dibble et al. |
| 6,213,234 B1 | 4/2001 | Rosen et al. |
| 6,239,520 B1 | 5/2001 | Stahl et al. |
| 6,265,786 B1 | 7/2001 | Bosley et al. |
| 6,274,945 B1 | 8/2001 | Gilbreth et al. |
| 6,281,596 B1 | 8/2001 | Gilbreth et al. |
| 6,281,601 B1 | 8/2001 | Edelman et al. |
| 6,305,079 B1 | 10/2001 | Child et al. |
| 6,314,717 B1 | 11/2001 | Teets et al. |
| 6,316,841 B1 | 11/2001 | Weber |
| 6,324,828 B1 | 12/2001 | Willis et al. |
| 6,324,846 B1 | 12/2001 | Clarke |
| 6,325,142 B1 | 12/2001 | Bosley et al. |
| 6,349,787 B1 | 2/2002 | Dakhil |
| 6,355,987 B1 | 3/2002 | Bixel |
| 6,361,271 B1 | 3/2002 | Bosley |
| 6,381,944 B2 | 5/2002 | Mackay |
| 6,405,522 B1 | 6/2002 | Pont et al. |
| 6,410,992 B1 | 6/2002 | Wall et al. |
| 6,425,732 B1 | 7/2002 | Rouse et al. |
| 6,437,468 B2 | 8/2002 | Stahl et al. |
| 6,438,936 B1 | 8/2002 | Ryan |
| 6,438,937 B1 | 8/2002 | Pont et al. |
| 6,453,658 B1 | 9/2002 | Willis et al. |
| 6,468,051 B2 | 10/2002 | Lampe et al. |
| 6,487,096 B1 | 11/2002 | Gilbreth et al. |
| 6,489,692 B1 | 12/2002 | Gilbreth et al. |
| 6,495,929 B2 | 12/2002 | Bosley et al. |
| 6,499,949 B2 | 12/2002 | Schafrik et al. |
| 6,522,030 B1 | 2/2003 | Wall et al. |
| 6,526,757 B2 | 3/2003 | MacKay |
| 6,539,720 B2 | 4/2003 | Rouse et al. |
| 6,542,791 B1 | 4/2003 | Perez |
| 6,543,232 B1 | 4/2003 | Anderson et al. |
| 6,552,440 B2 | 4/2003 | Gilbreth et al. |
| 6,574,950 B2 | 6/2003 | Nash |
| 6,598,400 B2 | 7/2003 | Nash et al. |
| 6,601,392 B2 | 8/2003 | Child |
| 6,605,928 B2 | 8/2003 | Gupta et al. |
| 6,606,864 B2 | 8/2003 | Mackay |
| 6,612,112 B2 | 9/2003 | Gilbreth et al. |
| 6,629,064 B1 | 9/2003 | Wall |
| 6,634,176 B2 | 10/2003 | Rouse et al. |
| 6,638,007 B2 | 10/2003 | Bartholomä et al. |
| 6,639,328 B2 | 10/2003 | Wacknov |
| 6,644,916 B1 | 11/2003 | Beacom |
| RE38,373 E | 12/2003 | Bosley |
| 6,657,332 B2 | 12/2003 | Balas |
| 6,657,348 B2 | 12/2003 | Qin et al. |
| 6,663,044 B1 | 12/2003 | Munoz et al. |
| 6,664,653 B1 | 12/2003 | Edelman |
| 6,664,654 B2 | 12/2003 | Wall et al. |
| 6,670,721 B2 | 12/2003 | Lof et al. |
| 6,675,583 B2 | 1/2004 | Willis et al. |
| 6,683,389 B2 | 1/2004 | Geis |
| 6,684,642 B2 | 2/2004 | Willis et al. |
| 6,698,208 B2 | 3/2004 | Teets |
| 6,698,554 B2 | 3/2004 | Desta et al. |
| 6,702,463 B1 | 3/2004 | Brockett et al. |
| 6,709,243 B1 | 3/2004 | Tan et al. |
| 6,713,892 B2 | 3/2004 | Gilbreth et al. |
| 6,720,685 B2 | 4/2004 | Balas |
| 6,729,141 B2 | 5/2004 | Ingram |
| 6,732,531 B2 | 5/2004 | Dickey |
| 6,735,951 B2 | 5/2004 | Thompson |
| 6,745,574 B1 | 6/2004 | Dettmer |
| 6,747,372 B2 | 6/2004 | Gilbreth et al. |
| 6,748,742 B2 | 6/2004 | Rouse et al. |
| 6,751,941 B2 | 6/2004 | Edelman et al. |
| 6,766,647 B2 | 7/2004 | Hartzheim |
| 6,784,565 B2 | 8/2004 | Wall et al. |
| 6,787,933 B2 | 9/2004 | Claude et al. |
| 6,794,766 B2 | 9/2004 | Wickert et al. |
| 6,796,527 B1 | 9/2004 | Munoz et al. |
| 6,804,946 B2 | 10/2004 | Willis et al. |
| 6,810,677 B2 | 11/2004 | Dewis |
| 6,812,586 B2 | 11/2004 | Wacknov et al. |
| 6,812,587 B2 | 11/2004 | Gilbreth et al. |
| 6,815,932 B2 | 11/2004 | Wall |
| 6,817,575 B1 | 11/2004 | Munoz et al. |
| 6,819,999 B2 | 11/2004 | Hartzheim |
| 6,823,675 B2 | 11/2004 | Brunell et al. |
| 6,829,899 B2 | 12/2004 | Benham, Jr. et al. |
| 6,832,470 B2 | 12/2004 | Dewis |
| 6,834,226 B2 | 12/2004 | Hartzheim |
| 6,836,720 B2 | 12/2004 | Hartzheim |
| 6,837,419 B2 | 1/2005 | Ryan |
| 6,845,558 B2 | 1/2005 | Beacom |
| 6,845,621 B2 | 1/2005 | Teets |
| 6,847,129 B2 | 1/2005 | McKelvey et al. |
| 6,847,194 B2 | 1/2005 | Sarlioglu et al. |
| 6,848,249 B2 | 2/2005 | Coleman et al. |
| 6,863,509 B2 | 3/2005 | Dewis |
| 6,864,595 B2 | 3/2005 | Wall |
| 6,870,279 B2 | 3/2005 | Gilbreth et al. |
| 6,877,323 B2 | 4/2005 | Dewis |
| 6,883,331 B2 | 4/2005 | Jonsson et al. |
| 6,888,263 B2 | 5/2005 | Satoh et al. |
| 6,891,282 B2 | 5/2005 | Gupta et al. |
| 6,895,760 B2 | 5/2005 | Kesseli |
| 6,897,578 B1 | 5/2005 | Olsen et al. |
| 6,909,199 B2 | 6/2005 | Gupta et al. |
| 6,911,742 B2 | 6/2005 | Gupta et al. |
| 6,931,856 B2 | 8/2005 | Belokon et al. |
| 6,951,110 B2 | 10/2005 | Kang |
| 6,956,301 B2 | 10/2005 | Gupta et al. |
| 6,958,550 B2 | 10/2005 | Gilbreth et al. |
| 6,960,840 B2 | 11/2005 | Willis et al. |
| 6,964,168 B1 | 11/2005 | Pierson et al. |
| 6,966,173 B2 | 11/2005 | Dewis |
| 6,968,702 B2 | 11/2005 | Child et al. |
| 6,973,880 B2 | 12/2005 | Kumar |
| 6,977,446 B2 | 12/2005 | Mackay |
| 6,979,914 B2 | 12/2005 | McKelvey et al. |
| 6,983,787 B2 | 1/2006 | Schoenenborn |
| 6,989,610 B2 | 1/2006 | Gupta et al. |
| 6,998,728 B2 | 2/2006 | Gupta et al. |
| 7,019,626 B1 | 3/2006 | Funk |
| 7,053,590 B2 | 5/2006 | Wang |
| 7,059,385 B2 | 6/2006 | Moilala |
| 7,065,873 B2 | 6/2006 | Kang et al. |
| RE39,190 E | 7/2006 | Weissert |
| 7,092,262 B2 | 8/2006 | Ryan et al. |
| 7,093,443 B2 | 8/2006 | McKelvey et al. |
| 7,093,448 B2 | 8/2006 | Nguyen et al. |
| 7,112,036 B2 | 9/2006 | Lubell et al. |
| 7,117,683 B2 | 10/2006 | Thompson |
| 7,147,050 B2 | 12/2006 | Kang et al. |
| 7,166,928 B2 | 1/2007 | Larsen |
| 7,181,337 B2 | 2/2007 | Kosaka |
| 7,185,496 B2 | 3/2007 | Herlihy |
| 7,186,200 B1 | 3/2007 | Hauser |
| 7,211,906 B2 | 5/2007 | Teets et al. |
| 7,224,081 B2 | 5/2007 | Larsen |
| 7,244,524 B2 | 7/2007 | McCluskey et al. |
| 7,266,429 B2 | 9/2007 | Travaly et al. |
| 7,285,871 B2 | 10/2007 | Derouineau |
| 7,299,638 B2 | 11/2007 | Mackay |
| 7,304,445 B2 | 12/2007 | Donnelly |
| 7,309,929 B2 | 12/2007 | Donnelly et al. |
| 7,318,154 B2 | 1/2008 | Tehee |
| 7,325,401 B1 | 2/2008 | Kesseli et al. |
| 7,343,744 B2 | 3/2008 | Abelson et al. |
| 7,393,179 B1 | 7/2008 | Kesseli et al. |

(56) References Cited

U.S. PATENT DOCUMENTS

| | | |
|---|---|---|
| 7,398,642 B2 | 7/2008 | McQuiggan |
| 7,404,294 B2 | 7/2008 | Sundin |
| 7,415,764 B2 | 8/2008 | Kang et al. |
| 7,423,412 B2 | 9/2008 | Weng et al. |
| 7,464,533 B2 | 12/2008 | Wollenweber |
| 7,513,120 B2 | 4/2009 | Kupratis |
| 7,514,807 B2 | 4/2009 | Donnelly et al. |
| 7,518,254 B2 | 4/2009 | Donnelly et al. |
| RE40,713 E | 5/2009 | Geis et al. |
| 7,554,278 B2 | 6/2009 | Wegner-Donnelly et al. |
| 7,565,867 B2 | 7/2009 | Donnelly et al. |
| 7,572,531 B2 | 8/2009 | Forte |
| 7,574,853 B2 | 8/2009 | Teets et al. |
| 7,574,867 B2 | 8/2009 | Teets et al. |
| 7,595,124 B2 | 9/2009 | Varatharajan et al. |
| 7,605,487 B2 | 10/2009 | Barton et al. |
| 7,605,498 B2 | 10/2009 | Ledenev et al. |
| 7,607,318 B2 | 10/2009 | Lui et al. |
| 7,608,937 B1 | 10/2009 | Altenschulte |
| 7,614,792 B2 | 11/2009 | Wade et al. |
| 7,615,881 B2 | 11/2009 | Halsey et al. |
| 7,617,687 B2 | 11/2009 | West et al. |
| 7,656,135 B2 | 2/2010 | Schram et al. |
| 7,667,347 B2 | 2/2010 | Donnelly et al. |
| 7,671,481 B2 | 3/2010 | Miller et al. |
| 7,766,790 B2 | 8/2010 | Stevenson et al. |
| 7,770,376 B1 | 8/2010 | Brostmeyer |
| 7,777,358 B2 | 8/2010 | Halsey et al. |
| 7,804,184 B2 | 9/2010 | Yuan et al. |
| 7,841,185 B2 | 11/2010 | Richards et al. |
| 7,861,696 B2 | 1/2011 | Lund |
| 7,866,532 B1 | 1/2011 | Potter et al. |
| 7,906,862 B2 | 3/2011 | Donnelly et al. |
| 7,921,944 B2 | 4/2011 | Russell et al. |
| 7,926,274 B2 | 4/2011 | Farkaly |
| 7,944,081 B2 | 5/2011 | Donnelly et al. |
| 7,957,846 B2 | 6/2011 | Hakim et al. |
| 7,966,868 B1 | 6/2011 | Sonnichsen et al. |
| 7,977,845 B1 | 7/2011 | Heitmann |
| 8,008,808 B2 | 8/2011 | Seeker et al. |
| 8,015,812 B1 | 9/2011 | Kesseli et al. |
| 8,046,990 B2 | 11/2011 | Bollinger et al. |
| 8,055,526 B2 | 11/2011 | Blagg et al. |
| 8,188,693 B2 | 5/2012 | Wei et al. |
| 8,244,419 B2 | 8/2012 | Wegner-Donnelly et al. |
| 2001/0030425 A1 | 10/2001 | Gilbreth et al. |
| 2001/0052704 A1 | 12/2001 | Bosley et al. |
| 2002/0054718 A1 | 5/2002 | Weissert |
| 2002/0063479 A1 | 5/2002 | Mitchell et al. |
| 2002/0067872 A1 | 6/2002 | Weissert |
| 2002/0073688 A1 | 6/2002 | Bosley et al. |
| 2002/0073713 A1 | 6/2002 | Mackay |
| 2002/0079760 A1 | 6/2002 | Vessa |
| 2002/0083714 A1 | 7/2002 | Bakholdin |
| 2002/0096393 A1 | 7/2002 | Rouse |
| 2002/0096959 A1 | 7/2002 | Qin et al. |
| 2002/0097928 A1 | 7/2002 | Swinton et al. |
| 2002/0099476 A1 | 7/2002 | Hamrin et al. |
| 2002/0103745 A1 | 8/2002 | Lof et al. |
| 2002/0104316 A1 | 8/2002 | Dickey et al. |
| 2002/0110450 A1 | 8/2002 | Swinton |
| 2002/0119040 A1 | 8/2002 | Bosley |
| 2002/0120368 A1 | 8/2002 | Edelman et al. |
| 2002/0124569 A1 | 9/2002 | Treece et al. |
| 2002/0128076 A1 | 9/2002 | Lubell |
| 2002/0148229 A1 | 10/2002 | Pont et al. |
| 2002/0149205 A1 | 10/2002 | Gilbreth et al. |
| 2002/0149206 A1 | 10/2002 | Gilbreth et al. |
| 2002/0157881 A1 | 10/2002 | Bakholdin et al. |
| 2002/0158517 A1 | 10/2002 | Rouse et al. |
| 2002/0166324 A1 | 11/2002 | Willis et al. |
| 2003/0110773 A1 | 6/2003 | Rouse et al. |
| 2004/0008010 A1 | 1/2004 | Ebrahim et al. |
| 2004/0011038 A1 | 1/2004 | Stinger et al. |
| 2004/0035656 A1 | 2/2004 | Anwar et al. |
| 2004/0065293 A1 | 4/2004 | Goto |
| 2004/0080165 A1 | 4/2004 | Geis et al. |
| 2004/0090204 A1 | 5/2004 | McGinley |
| 2004/0103669 A1 | 6/2004 | Willis et al. |
| 2004/0106486 A1 | 6/2004 | Jonsson |
| 2004/0119291 A1 | 6/2004 | Hamrin et al. |
| 2004/0148942 A1 | 8/2004 | Pont et al. |
| 2004/0160061 A1 | 8/2004 | Rouse et al. |
| 2005/0000224 A1 | 1/2005 | Jonsson |
| 2005/0103931 A1 | 5/2005 | Morris et al. |
| 2005/0206331 A1 | 9/2005 | Donnelly |
| 2005/0228553 A1 | 10/2005 | Tryon |
| 2005/0229586 A1 | 10/2005 | Whurr |
| 2006/0076171 A1 | 4/2006 | Donnelly et al. |
| 2006/0090109 A1 | 4/2006 | Bonnet |
| 2007/0012129 A1 | 1/2007 | Maty et al. |
| 2007/0068712 A1 | 3/2007 | Carnahan |
| 2007/0178340 A1 | 8/2007 | Eickhoff |
| 2007/0181294 A1 | 8/2007 | Soldner et al. |
| 2007/0239325 A1 | 10/2007 | Regunath |
| 2007/0290039 A1 | 12/2007 | Pfleging et al. |
| 2008/0034759 A1 | 2/2008 | Bulman et al. |
| 2008/0080682 A1 | 4/2008 | Ogunwale et al. |
| 2008/0148708 A1 | 6/2008 | Chou et al. |
| 2008/0197705 A1 | 8/2008 | Dewis et al. |
| 2008/0208393 A1 | 8/2008 | Schricker |
| 2008/0243352 A1 | 10/2008 | Healy |
| 2008/0271703 A1 | 11/2008 | Armstrong et al. |
| 2008/0278000 A1 | 11/2008 | Capp et al. |
| 2009/0045292 A1 | 2/2009 | Maddali et al. |
| 2009/0071478 A1 | 3/2009 | Kalfon |
| 2009/0090109 A1 | 4/2009 | Mills et al. |
| 2009/0106978 A1 | 4/2009 | Wollenweber |
| 2009/0109022 A1 | 4/2009 | Gangopadhyay et al. |
| 2009/0158739 A1 | 6/2009 | Messmer |
| 2009/0193809 A1 | 8/2009 | Schroder et al. |
| 2009/0204316 A1 | 8/2009 | Klampfl et al. |
| 2009/0211260 A1 | 8/2009 | Kesseli et al. |
| 2009/0211739 A1 | 8/2009 | Nash et al. |
| 2009/0211740 A1 | 8/2009 | Kesseli et al. |
| 2009/0249786 A1 | 10/2009 | Garrett et al. |
| 2009/0271086 A1 | 10/2009 | Morris et al. |
| 2009/0292436 A1 | 11/2009 | D'Amato et al. |
| 2009/0313990 A1 | 12/2009 | Mustafa |
| 2009/0326753 A1 | 12/2009 | Chen et al. |
| 2010/0021284 A1 | 1/2010 | Watson et al. |
| 2010/0052425 A1 | 3/2010 | Moore et al. |
| 2010/0127570 A1 | 5/2010 | Hadar et al. |
| 2010/0154380 A1 | 6/2010 | Tangirala et al. |
| 2010/0229525 A1 | 9/2010 | Mackay et al. |
| 2010/0288571 A1 | 11/2010 | Dewis et al. |
| 2010/0293946 A1 | 11/2010 | Vick |
| 2010/0301062 A1 | 12/2010 | Litwin et al. |
| 2010/0319355 A1 | 12/2010 | Prabhu |
| 2011/0020108 A1 | 1/2011 | Axelsson et al. |
| 2011/0100777 A1 | 5/2011 | Wilton et al. |
| 2011/0215640 A1 | 9/2011 | Donnelly |
| 2011/0288738 A1 | 11/2011 | Donnelly et al. |
| 2011/0295453 A1 | 12/2011 | Betz et al. |
| 2012/0000204 A1 | 1/2012 | Kesseli et al. |
| 2012/0017598 A1* | 1/2012 | Kesseli et al. .................. 60/772 |
| 2012/0042656 A1 | 2/2012 | Donnelly et al. |
| 2012/0096869 A1 | 4/2012 | Kesseli et al. |
| 2012/0102911 A1 | 5/2012 | Dewis et al. |
| 2012/0175886 A1 | 7/2012 | Donnelly et al. |
| 2012/0201657 A1 | 8/2012 | Donnelly et al. |
| 2012/0260662 A1 | 10/2012 | Nash et al. |
| 2012/0324903 A1 | 12/2012 | Dewis et al. |
| 2013/0111923 A1 | 5/2013 | Donnelly et al. |
| 2013/0133480 A1 | 5/2013 | Donnelly |
| 2013/0139519 A1 | 6/2013 | Kesseli et al. |
| 2013/0294892 A1 | 11/2013 | Dewis et al. |
| 2013/0305730 A1 | 11/2013 | Donnelly et al. |

(56) References Cited

U.S. PATENT DOCUMENTS

| | | | |
|---|---|---|---|
| 2014/0000275 | A1 | 1/2014 | Kesseli et al. |
| 2014/0026585 | A1 | 1/2014 | Baldwin |
| 2014/0306460 | A1 | 10/2014 | Donnelly |

FOREIGN PATENT DOCUMENTS

| | | |
|---|---|---|
| AU | 587266 | 8/1989 |
| AU | 8517301 | 3/2002 |
| AU | 2025002 | 5/2002 |
| AU | 2589802 | 5/2002 |
| AU | 2004203836 | 3/2005 |
| AU | 2004208656 | 2/2009 |
| AU | 2004318142 | 6/2009 |
| CA | 1050637 | 3/1979 |
| CA | 1068492 | 12/1979 |
| CA | 1098997 | 4/1981 |
| CA | 1099373 | 4/1981 |
| CA | 1133263 | 10/1982 |
| CA | 1171671 | 7/1984 |
| CA | 1190050 | 7/1985 |
| CA | 1202099 | 3/1986 |
| CA | 1244661 | 11/1988 |
| CA | 1275719 | 10/1990 |
| CA | 2066258 | 3/1991 |
| CA | 1286882 | 7/1991 |
| CA | 2220172 | 5/1998 |
| CA | 2234318 | 10/1998 |
| CA | 2238356 | 3/1999 |
| CA | 2242947 | 3/1999 |
| CA | 2246769 | 3/1999 |
| CA | 2279320 | 4/2000 |
| CA | 2677758 | 4/2000 |
| CA | 2317855 | 5/2001 |
| CA | 2254034 | 6/2007 |
| CA | 2638648 | 2/2009 |
| CA | 2689188 | 7/2010 |
| CH | 595552 | 2/1978 |
| CH | 679235 | 1/1992 |
| CN | 1052170 | 6/1991 |
| CN | 1060270 | 4/1992 |
| CN | 1306603 | 8/2001 |
| CN | 1317634 | 10/2001 |
| CN | 1902389 | 1/2007 |
| CN | 101098079 | 1/2008 |
| CN | 100564811 | 12/2009 |
| CN | 101635449 | 1/2010 |
| CN | 101672252 | 3/2010 |
| CS | 9101996 | 1/1992 |
| CZ | 20014556 | 4/2003 |
| DE | 1272306 | 7/1968 |
| DE | 2753673 | 6/1978 |
| DE | 2853919 | 6/1979 |
| DE | 3140694 | 7/1982 |
| DE | 3736984 | 5/1988 |
| DE | 69519684 | 8/2001 |
| DE | 10305352 | 9/2004 |
| DE | 69828916 | 3/2006 |
| DE | 60125441 | 2/2007 |
| DE | 60125583 | 2/2007 |
| DK | 331889 | 7/1989 |
| EP | 0092551 | 11/1983 |
| EP | 0093118 | 11/1983 |
| EP | 0104921 | 4/1984 |
| EP | 0157794 | 10/1985 |
| EP | 0377292 | 7/1990 |
| EP | 0319246 | 10/1990 |
| EP | 0432753 | 6/1991 |
| EP | 0455640 | 11/1991 |
| EP | 0472294 | 2/1992 |
| EP | 0478713 | 4/1992 |
| EP | 0493481 | 7/1992 |
| EP | 0522832 | 1/1993 |
| EP | 0620906 | 10/1994 |
| EP | 0691511 | 1/1996 |
| EP | 0754142 | 1/1997 |
| EP | 0784156 | 12/1997 |
| EP | 0837224 | 4/1998 |
| EP | 0837231 | 4/1998 |
| EP | 0901218 | 3/1999 |
| EP | 0698178 | 6/1999 |
| EP | 0963035 | 12/1999 |
| EP | 1055809 | 11/2000 |
| EP | 1075724 | 2/2001 |
| EP | 1046786 | 1/2002 |
| EP | 1071185 | 1/2002 |
| EP | 1215393 | 6/2002 |
| EP | 0739087 | 8/2002 |
| EP | 1240713 | 9/2002 |
| EP | 1277267 | 1/2003 |
| EP | 1283166 | 2/2003 |
| EP | 1305210 | 5/2003 |
| EP | 1340301 | 9/2003 |
| EP | 1340304 | 9/2003 |
| EP | 1341990 | 9/2003 |
| EP | 1342044 | 9/2003 |
| EP | 1346139 | 9/2003 |
| EP | 1436504 | 7/2004 |
| EP | 1203866 | 8/2004 |
| EP | 0800616 | 12/2004 |
| EP | 1519011 | 3/2005 |
| EP | 1132614 | 1/2007 |
| EP | 1790568 | 5/2007 |
| EP | 1813807 | 8/2007 |
| EP | 1825115 | 8/2007 |
| EP | 1860750 | 11/2007 |
| EP | 1939396 | 7/2008 |
| EP | 2028104 | 2/2009 |
| EP | 1638184 | 3/2009 |
| EP | 1648096 | 7/2009 |
| EP | 2108828 | 10/2009 |
| EP | 1728990 | 11/2009 |
| EP | 2161444 | 3/2010 |
| EP | 2169800 | 3/2010 |
| EP | 1713141 | 5/2010 |
| EP | 1728304 | 6/2010 |
| EP | 1468180 | 7/2010 |
| FR | 2467286 | 11/1985 |
| FR | 2637942 | 4/1990 |
| FR | 2645908 | 10/1990 |
| FR | 2755319 | 4/1998 |
| FR | 2848647 | 6/2004 |
| GB | 612817 | 11/1948 |
| GB | 671379 | 5/1952 |
| GB | 673961 | 6/1952 |
| GB | 706743 | 4/1954 |
| GB | 731735 | 6/1955 |
| GB | 761955 | 11/1956 |
| GB | 768047 | 2/1957 |
| GB | 784119 | 10/1957 |
| GB | 786001 | 11/1957 |
| GB | 789589 | 1/1958 |
| GB | 807267 | 1/1959 |
| GB | 817507 | 7/1959 |
| GB | 834550 | 5/1960 |
| GB | 864712 | 4/1961 |
| GB | 874251 | 8/1961 |
| GB | 877838 | 9/1961 |
| GB | 878552 | 10/1961 |
| GB | 885184 | 12/1961 |
| GB | 917392 | 2/1963 |
| GB | 919540 | 2/1963 |
| GB | 920408 | 3/1963 |
| GB | 924078 | 4/1963 |
| GB | 931926 | 7/1963 |
| GB | 937278 | 9/1963 |
| GB | 937681 | 9/1963 |
| GB | 950015 | 2/1964 |
| GB | 950506 | 2/1964 |
| GB | 977402 | 12/1964 |
| GB | 993039 | 5/1965 |
| GB | 1004953 | 9/1965 |
| GB | 1008310 | 10/1965 |
| GB | 1009115 | 11/1965 |

(56) References Cited

FOREIGN PATENT DOCUMENTS

| | | |
|---|---|---|
| GB | 1012909 | 12/1965 |
| GB | 1043271 | 9/1966 |
| GB | 1083943 | 9/1967 |
| GB | 1097623 | 1/1968 |
| GB | 1103032 | 2/1968 |
| GB | 1127856 | 9/1968 |
| GB | 1137691 | 12/1968 |
| GB | 1138807 | 1/1969 |
| GB | 1141019 | 1/1969 |
| GB | 1148179 | 4/1969 |
| GB | 1158271 | 7/1969 |
| GB | 1172126 | 11/1969 |
| GB | 1174207 | 12/1969 |
| GB | 1211607 | 11/1970 |
| GB | 1270011 | 4/1972 |
| GB | 1275753 | 5/1972 |
| GB | 1275754 | 5/1972 |
| GB | 1275755 | 5/1972 |
| GB | 1301104 | 12/1972 |
| GB | 1348797 | 3/1974 |
| GB | 1392271 | 4/1975 |
| GB | 1454766 | 11/1976 |
| GB | 1460590 | 1/1977 |
| GB | 1516664 | 7/1978 |
| GB | 2019494 | 10/1979 |
| GB | 2074254 | 10/1981 |
| GB | 2089433 | 6/1982 |
| GB | 2123154 | 1/1984 |
| GB | 2174824 | 11/1986 |
| GB | 2184609 | 6/1987 |
| GB | 2199083 | 6/1988 |
| GB | 2211285 | 6/1989 |
| GB | 2218255 | 11/1989 |
| GB | 2232207 | 12/1990 |
| GB | 2341897 | 3/2000 |
| GB | 2355286 | 4/2001 |
| GB | 2420615 | 5/2006 |
| GB | 2426043 | 11/2006 |
| GB | 2435529 | 8/2007 |
| GB | 2436708 | 10/2007 |
| GB | 2441924 | 3/2008 |
| GB | 2442585 | 4/2008 |
| GB | 2456336 | 7/2009 |
| GB | 2456672 | 7/2009 |
| GB | 2447514 | 12/2009 |
| IN | 4946DELNP2006 | 8/2007 |
| IN | 4341DELNP2005 | 10/2007 |
| IN | 5879DELNP2008 | 9/2008 |
| IN | 2502DEL2005 | 10/2009 |
| IN | 55DEL2010 | 7/2010 |
| IN | 1913DEL2009 | 7/2010 |
| IN | 2013DEL2009 | 7/2010 |
| IT | 1173399 | 6/1987 |
| IT | 1194590 | 9/1988 |
| IT | MI911564 | 1/1992 |
| JP | 51-065252 | 6/1976 |
| JP | 56-088920 | 7/1981 |
| JP | 56-148624 | 11/1981 |
| JP | 56-148625 | 11/1981 |
| JP | S59-010709 | 1/1984 |
| JP | 60-184973 | 9/1985 |
| JP | S60-184906 | 9/1985 |
| JP | 61-182489 | 8/1986 |
| JP | 3182638 | 8/1991 |
| JP | 6201891 | 7/1994 |
| JP | 2519620 | 7/1996 |
| JP | 10-054561 | 2/1998 |
| JP | 10-061660 | 3/1998 |
| JP | 10-115229 | 5/1998 |
| JP | 10-122180 | 5/1998 |
| JP | 11-324727 | 11/1999 |
| JP | 2000-054855 | 2/2000 |
| JP | 2000-130319 | 5/2000 |
| JP | 2000-329096 | 11/2000 |
| JP | 2002-030942 | 1/2002 |
| JP | 2002-115565 | 4/2002 |
| JP | 2003-009593 | 1/2003 |
| JP | 2003-013744 | 1/2003 |
| JP | 2003-041906 | 2/2003 |
| JP | 2004-163087 | 6/2004 |
| JP | 2005-345095 | 12/2005 |
| JP | 2006-022811 | 1/2006 |
| JP | 2006-170208 | 6/2006 |
| JP | 2006-174694 | 6/2006 |
| JP | 2006-200438 | 8/2006 |
| JP | 2007-231949 | 9/2007 |
| JP | 2008-111438 | 5/2008 |
| JP | 2008-132973 | 6/2008 |
| JP | 2009-108756 | 5/2009 |
| JP | 2009-108860 | 5/2009 |
| JP | 2009-209931 | 9/2009 |
| JP | 2009-216085 | 9/2009 |
| JP | 2009-250040 | 10/2009 |
| JP | 2010-014114 | 1/2010 |
| JP | 2010-106835 | 5/2010 |
| KR | 19840002483 | 12/1984 |
| KR | 880002362 | 10/1988 |
| KR | 890001170 | 4/1989 |
| KR | 1020010007189 | 1/2001 |
| KR | 1020020024545 | 3/2002 |
| KR | 1020030032864 | 4/2003 |
| KR | 1020060096320 | 9/2006 |
| KR | 1020070078978 | 8/2007 |
| KR | 1020070113990 | 11/2007 |
| KR | 1020080033866 | 4/2008 |
| KR | 1020090121248 | 11/2009 |
| NL | 7903120 | 10/1979 |
| SE | 437543 | 3/1985 |
| SE | 9901718 | 5/1999 |
| SE | 0103180 | 3/2003 |
| WO | WO 8501326 | 3/1985 |
| WO | WO 9207221 | 4/1992 |
| WO | WO 9524072 | 9/1995 |
| WO | WO 9722176 | 6/1997 |
| WO | WO 9722789 | 6/1997 |
| WO | WO 9726491 | 7/1997 |
| WO | WO 9825014 | 6/1998 |
| WO | WO 9854448 | 12/1998 |
| WO | WO 9919161 | 4/1999 |
| WO | WO 0140644 | 6/2001 |
| WO | WO 0182448 | 11/2001 |
| WO | WO 0202920 | 1/2002 |
| WO | WO 0229225 | 4/2002 |
| WO | WO 0239045 | 5/2002 |
| WO | WO 0240844 | 5/2002 |
| WO | WO 0242611 | 5/2002 |
| WO | WO 0244574 | 6/2002 |
| WO | WO 0250618 | 6/2002 |
| WO | WO 02037638 | 9/2002 |
| WO | WO 03093652 | 11/2003 |
| WO | WO 2004077637 | 9/2004 |
| WO | WO 2005045345 | 5/2005 |
| WO | WO 2005099063 | 10/2005 |
| WO | WO 2008044972 | 4/2008 |
| WO | WO 2008044973 | 4/2008 |
| WO | WO 2008082334 | 7/2008 |
| WO | WO 2008082335 | 7/2008 |
| WO | WO 2008082336 | 7/2008 |
| WO | WO 2009067048 | 5/2009 |
| WO | WO 2010050856 | 5/2010 |
| WO | WO 2010082893 | 7/2010 |
| ZA | 8608745 | 7/1987 |

OTHER PUBLICATIONS

U.S. Appl. No. 13/226,156, filed Sep. 6, 2011, Donnelly et al.
U.S. Appl. No. 13/372,998, filed Feb. 14, 2012, Nash et al.
U.S. Appl. No. 13/481,469, filed May 25, 2012, Wilson.
"Analysis of Technology Options to Reduce the Fuel Consumption of Idling Trucks," Stodolsky, F., L. Gaines, and A. Vyas, Argonne National Laboratory, ANL/ESD-43, Jun. 2000, 40 pages.
"Why Gas Turbines have a Future in Heavy Duty Trucks." Capstone Turbine Corporation, Brayton Energy, LLC, Kenworth Truck Com-

(56) References Cited

OTHER PUBLICATIONS pany, a PACCAR Company, Peterbilt Truck Company, a PACCAR Company, Apr. 2009, 10 pages.
Balogh et al. "DC Link Floating for Grid Connected PV Converters," World Academy of Science, Engineering and Technology Apr. 2008, Iss. 40, pp. 115-120.
Mackay et al. "High Efficiency Vehicular Gas Turbines," SAE International, 2005, 10 pages.
Nemeth et al. "Life Predicted in a Probabilistic Design Space for Brittle Materials With Transient Loads," NASA, last updated Jul. 21, 2005, found at http://www.grc.nasa.gov/WWW/RT/2004/RS/RS06L-nemeth.html, 5 pages.
Wolf et al. "Preliminary Design and Projected Performance for Intercooled-Recuperated Microturbine," Proceedings of the ASME TurboExpo 2008 Microturbine and Small Turbomachinery Systems, Jun. 9-13, 2008, Berlin, Germany, 10 pages.
"Remy HVH250-090-SOM Electric Motor," Remy International, Inc., 2011, 2 pages.
Gieras et al., "Performance Calculation for a High-Speed Solid-Rotor Induction Motor," IEEE Transactions on Industrial Electronics, 2012, vol. 59, No. 6, pp. 2689-2700.

* cited by examiner

CERAMIC-TO-METAL TURBINE SHAFT ATTACHMENT

CROSS REFERENCE TO RELATED APPLICATION

The present application claims the benefits, under 35 U.S.C. §119(e), of U.S. Provisional Application Ser. No. 61/488,575 entitled "Ceramic-to-Metal Turbine Shaft Attachment" filed on May 20, 2011, which is incorporated herein by reference.

FIELD

This disclosure relates generally to the field of vehicle propulsion and power generation and more specifically to an apparatus attaching a ceramic turbine rotor to a metal shaft.

BACKGROUND

There is a growing requirement for alternate fuels for vehicle propulsion and power generation. These include fuels such as natural gas, bio-diesel, ethanol, butanol, hydrogen and the like. Means of utilizing fuels needs to be accomplished more efficiently and with substantially lower carbon dioxide emissions and other air pollutants such as NOxs.

The gas turbine or Brayton cycle power plant has demonstrated many attractive features which make it a candidate for advanced vehicular propulsion and power generation. Gas turbine engines have the advantage of being highly fuel flexible and fuel tolerant. Additionally, these engines burn fuel at a lower temperature than reciprocating engines so produce substantially less NOx per mass of fuel burned.

The efficiency of gas turbine engines can be improved and engine size can be further reduced by increasing the pressure and temperature developed in the combustor while still remaining well below the temperature threshold of significant NOx production. This can be done using a conventional metallic combustor or a thermal reactor to extract energy from the fuel. As combustor temperature and pressure are raised, new requirements are generated in other components, such as the recuperator and compressor-turbine spools.

In a high efficiency gas turbine engine, the turbine adjacent to the combustor may have a ceramic rotor or it may be an all-ceramic turbine (volute, rotor, rotor shroud). The ceramic rotor is typically attached to a shaft which in turn is usually attached to a compressor which is comprised of a metallic rotor because the compressor blades see much lower temperatures than the turbine blades. The ceramic-to-metal attachment joint represents one of an important feature that, if not designed correctly, can limit the allowable operating temperature of the turbine rotor especially in small turbo-compressor spools such as used in turbo-chargers and microturbines. Most prior art joints are limited to operating temperatures below 800° K. The objective of achieving increased efficiency is pushing the rotor temperatures to levels approaching 1,400° K and, in the future, higher. In the prior art, this joint is typically located close to the turbine rotor, thereby requiring aggressive cooling to maintain the allowable temperature at and around the joint. The steep thermal gradient also creates an area of elevated thermal stress at and around the joint.

There remains a need for a joint design that will allow increased combustor temperatures which, in turn, can improve overall engine efficiency and reduce engine size while maintaining very low levels of NOx production.

SUMMARY

These and other needs are addressed by the various embodiments and configurations of the present disclosure which are directed generally to gas turbine engine systems and specifically to moving the temperature-limited joint to a location between the bearings near the center of the shaft joining the turbine and compressor. This placement lowers the temperature at and around the joint and reduces the sharp gradient (and associated thermal stress) which naturally occurs between the turbine rotor and the cooler joint. This requires a large outside diameter bearing on the turbine side so that it can be assembled. It is also anticipated that the ceramic turbine stub shaft needs to be relatively large in diameter relative to the steel shaft to have the proper stiffness.

In a first configuration the bearing closest to the compressor is an oil bearing and the bearing closest to the turbine is an air bearing.

In another configuration the bearing closest to the compressor is an oil bearing and the bearing closest to the turbine is also an oil bearing.

In yet another configuration the bearing closest to the compressor is an air bearing and the bearing closest to the turbine is also an air bearing. This all-air bearing configuration for the ceramic turbine may be difficult, since air is not as good as oil for cooling. Moving the metallic-ceramic joint between the bearings may provide sufficient isolation to enable the all-air bearing solution.

In various configurations, one or more of the following elements are employed:

1. Relocation of the metallic-ceramic joint substantially further away from the hot turbine gases to substantially reduce the thermal gradient and the thermal stress on the joint.
2. Relocating the joint on the other side of the bearing closest to the turbine.
3. Increasing the diameter of the ceramic shaft coming off the ceramic rotor and using a short, smooth transition down to the diameter of the metallic shaft.
4. In place of the ceramic shaft being inserted into a counterbore in the metallic shaft, the diameter of the ceramic and metallic shaft are the same. Brazing and the use of a connecting sleeve are used to form a strong joint with the required stiffness.
5. Relocating the joint so that either an all-oil bearing; an all-air-bearing; or a combination air and oil bearing system can be used.

In one embodiment, an engine is comprised of a plurality of turbo-compressor spool assemblies, each turbo-compressor spool assembly comprising a compressor and a turbine attached by a common shaft and a first of the turbo-compressor spool assemblies is in fluid communication with a second of the turbo-compressor spool assemblies, at least one of the common shafts of a selected turbo-compressor spool assembly comprising a metallic compressor rotor and a ceramic turbine rotor connected by a metallic-to-ceramic attachment joint and a first bearing being positioned adjacent to the metallic compressor rotor and a second bearing adjacent to the ceramic turbine rotor; a free power turbine driven by a gas flow output by at least one of the turbo-compressor assemblies; and a combustor operable to combust a fuel and a gas output by one of the plurality of turbo-compressor spool assemblies, wherein: when the engine is in operation, the ceramic turbine rotor of the selected turbo-compressor spool assembly operates in a no-failure regime of the ceramic material; the ceramic-to-metallic attachment joint is located on the common shaft of the selected turbo-compressor spool assembly to be in a no-failure regime of the ceramic material, the location of the metallic-to-ceramic attachment joint being positioned between the first and second bearings on the common shaft, and when the engine is in operation, the metallic-to-ceramic attachment joint operates at a temperature of no more than about 800° K.

In another embodiment, an engine is comprised of a plurality of turbo-compressor spool assemblies, each turbo-compressor spool assembly comprising a compressor and a turbine attached by a common shaft and a first of the turbo-compressor spool assemblies is in fluid communication with a second of the turbo-compressor spool assemblies; a free power turbine driven by a gas flow output by at least one of the turbo-compressor assemblies; and a combustor operable to combust a fuel and a gas output by one of the plurality of turbo-compressor spool assemblies, wherein a selected turbo-compressor spool assembly comprises a metallic compressor rotor and a ceramic turbine rotor connected by a metallic-to-ceramic attachment joint, wherein a first and second bearings are located along a common shaft of the selected turbo-compressor spool assembly, and wherein at least one of the following is true: (i) a turbine rotor of a selected turbo-compressor spool assembly operates in a no-failure regime of the ceramic material and the metallic-to-ceramic attachment joint is located to be in a no-failure regime of the ceramic material; (ii) the metallic-to-ceramic attachment joint is located between the first and second bearings; (iii) a ceramic portion of the common shaft has a length of at least about 40% of a length of the shaft; and (iv) respective diameters of the ceramic portion and a metallic portion of the common shaft are substantially the same in the vicinity of the metallic-to-ceramic attachment joint.

A method is disclosed, comprising providing a gas turbine engine, the gas turbine engine comprising a turbo-compressor spool assembly, the turbo-compressor spool assembly comprising a compressor and a turbine attached by a common shaft, a free power turbine driven by a gas flow output by the turbo-compressor assembly, and a combustor operable to combust a fuel and a gas output by the turbo-compressor spool assembly, the compressor comprising a metallic compressor rotor and the turbine comprising a ceramic turbine rotor connected by a metallic-to-ceramic attachment joint; and when the gas turbine engine is in operation, maintaining the turbine rotor and the metallic-to-ceramic attachment joint in a no-failure regime of the ceramic material.

The following definitions are used herein:

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

A bellows is a flexible or deformable, expandable and/or contractable, container or enclosure. A bellows is typically a container which is deformable in such a way as to alter its volume. A bellows can refer to a device for delivering pressurized air in a controlled quantity to a controlled location.

A ceramic is an inorganic, nonmetallic solid prepared by the action of heating and cooling. Ceramic materials may have a crystalline or partly crystalline structure, or may be amorphous (e.g., a glass).

An engine is a prime mover and refers to any device that uses energy to develop mechanical power, such as motion in some other machine. Examples are diesel engines, gas turbine engines, microturbines, Stirling engines and spark ignition engines.

A free power turbine as used herein is a turbine which is driven by a gas flow and whose rotary power is the principal mechanical output power shaft. A free power turbine is not connected to a compressor in the gasifier section, although the free power turbine may be in the gasifier section of the gas turbine engine. A power turbine may also be connected to a compressor in the gasifier section in addition to providing rotary power to an output power shaft.

A gas turbine engine as used herein may also be referred to as a turbine engine or microturbine engine. A microturbine is commonly a sub category under the class of prime movers called gas turbines and is typically a gas turbine with an output power in the approximate range of about a few kilowatts to about 700 kilowatts. A turbine or gas turbine engine is commonly used to describe engines with output power in the range above about 700 kilowatts. As can be appreciated, a gas turbine engine can be a microturbine since the engines may be similar in architecture but differing in output power level. The power level at which a microturbine becomes a turbine engine is arbitrary and the distinction has no meaning as used herein.

A gasifier is a turbine-driven compressor in a gas turbine engine dedicated to compressing air that, once heated, is expanded through a free power turbine to produce A prime power source refers to any device that uses energy to develop mechanical or electrical power, such as motion in some other machine. Examples are diesel engines, gas turbine engines, microturbines, Stirling engines, spark ignition engines and fuel cells.

A heat exchanger is a device that allows heat energy from a hotter fluid to be transferred to a cooler fluid without the hotter fluid and cooler fluid coming in contact. The two fluids are typically separated from each other by a solid material, such as a metal, that has a high thermal conductivity.

The term means shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

A metallic material is a material containing a metal or a metallic compound. A metal refers commonly to alkali metals, alkaline-earth metals, radioactive and nonradioactive rare earth metals, transition metals, and other metals.

The no-failure regime of a ceramic material, as used herein, refers to the region of a flexural strength versus temperature graph for ceramic materials wherein both the flexural stress and temperature are low enough that the ceramic material has a very low probability of failure and has a lifetime of a very large number of flexural and/or thermal cycles. Operation of the ceramic material in the no-failure regime means that the combination of maximum flexural stress and maximum temperature do not approach a failure limit such as the Weibull strength variability regime, the fast fracture regime, the slow crack growth regime or the creep fracture regime as illustrated in FIG. 3. When the ceramic material approaches or enters any of these failure regimes, then the probability of failure is increased precipitously and the lifetime to failure of the component is reduced precipitously. This applies to ceramic components that are manufactured within their design specifications from ceramic materials that are also within their design specifications. Typically, the no-failure regime of the ceramics used herein exists at operating temperatures of no more than about 1,550° K, more typically of no more than about 1,500° K, and even more typically of no more than about 1,400° K. Common maximum flexural strengths for the no-failure regime of the ceramics used herein are about 250 MPa and more commonly about 175 MPa.

Power density as used herein is power per unit volume (watts per cubic meter).

A recuperator is a heat exchanger dedicated to returning exhaust heat energy from a process back into the process to increase process efficiency. In a gas turbine thermodynamic cycle, heat energy is transferred from the turbine discharge to the combustor inlet gas stream, thereby reducing heating required by fuel to achieve a requisite firing temperature.

Regenerative braking is the same as dynamic braking except the electrical energy generated is captured in an energy storage system for future use.

Specific power as used herein is power per unit mass (watts per kilogram).

Spool refers to a group of turbo machinery components on a common shaft.

A thermal energy storage module is a device that includes either a metallic heat storage element or a ceramic heat storage element with embedded electrically conductive wires. A thermal energy storage module is similar to a heat storage block but is typically smaller in size and energy storage capacity.

A thermal oxidizer is a type of combustor comprised of a matrix material which is typically a ceramic and a large number of channels which are typically circular in cross section. When a fuel-air mixture is passed through the thermal oxidizer, it begins to react as it flows along the channels until it is fully reacted when it exits the thermal oxidizer. A thermal oxidizer is characterized by a smooth combustion process as the flow down the channels is effectively one-dimensional fully developed flow with a marked absence of hot spots.

A thermal reactor, as used herein, is another name for a thermal oxidizer.

A turbine is a rotary machine in which mechanical work is continuously extracted from a moving fluid by expanding the fluid from a higher pressure to a lower pressure. The simplest turbines have one moving part, a rotor assembly, which is a shaft or drum with blades attached. Moving fluid acts on the blades, or the blades react to the flow, so that they move and impart rotational energy to the rotor.

Turbine Inlet Temperature (TIT) as used herein refers to the gas temperature at the outlet of the combustor which is closely connected to the inlet of the high pressure turbine and these are generally taken to be the same temperature.

A turbo-compressor spool assembly as used herein refers to an assembly typically comprised of an outer case, a radial compressor, a radial turbine wherein the radial compressor and radial turbine are attached to a common shaft. The assembly also includes inlet ducting for the compressor, a compressor rotor, a diffuser for the compressor outlet, a volute for incoming flow to the turbine, a turbine rotor and an outlet diffuser for the turbine. The shaft connecting the compressor and turbine includes a bearing system.

A volute is a scroll transition duct which looks like a tuba or a snail shell. Volutes may be used to channel flow gases from one component of a gas turbine to the next. Gases flow through the helical body of the scroll and are redirected into the next component. A key advantage of the scroll is that the device inherently provides a constant flow angle at the inlet and outlet. To date, this type of transition duct has only been successfully used on small engines or turbochargers where the geometrical fabrication issues are less involved.

Weibull statistics are used in characterizing the strength of brittle materials such as most ceramics and relate a series of bending strength measurements to the probability of failure. Weibull statistics include a strength modulus called Weibull modulus.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the disclosure. In the drawings, like reference numerals refer to like or analogous components throughout the several views.

DETAILED DESCRIPTION

Exemplary Gas Turbine Engine

An exemplary engine is a high efficiency gas turbine engine. It typically has lower NOx emissions, is more fuel flexible and has lower maintenance costs than comparable reciprocating engines. For example, an intercooled recuperated gas turbine engine in the range of about 10 kW to about 750 kW is available with thermal efficiencies above 40%. A schematic of an intercooled, recuperated gas turbine engine is shown in FIG. 1.

Figure 1:
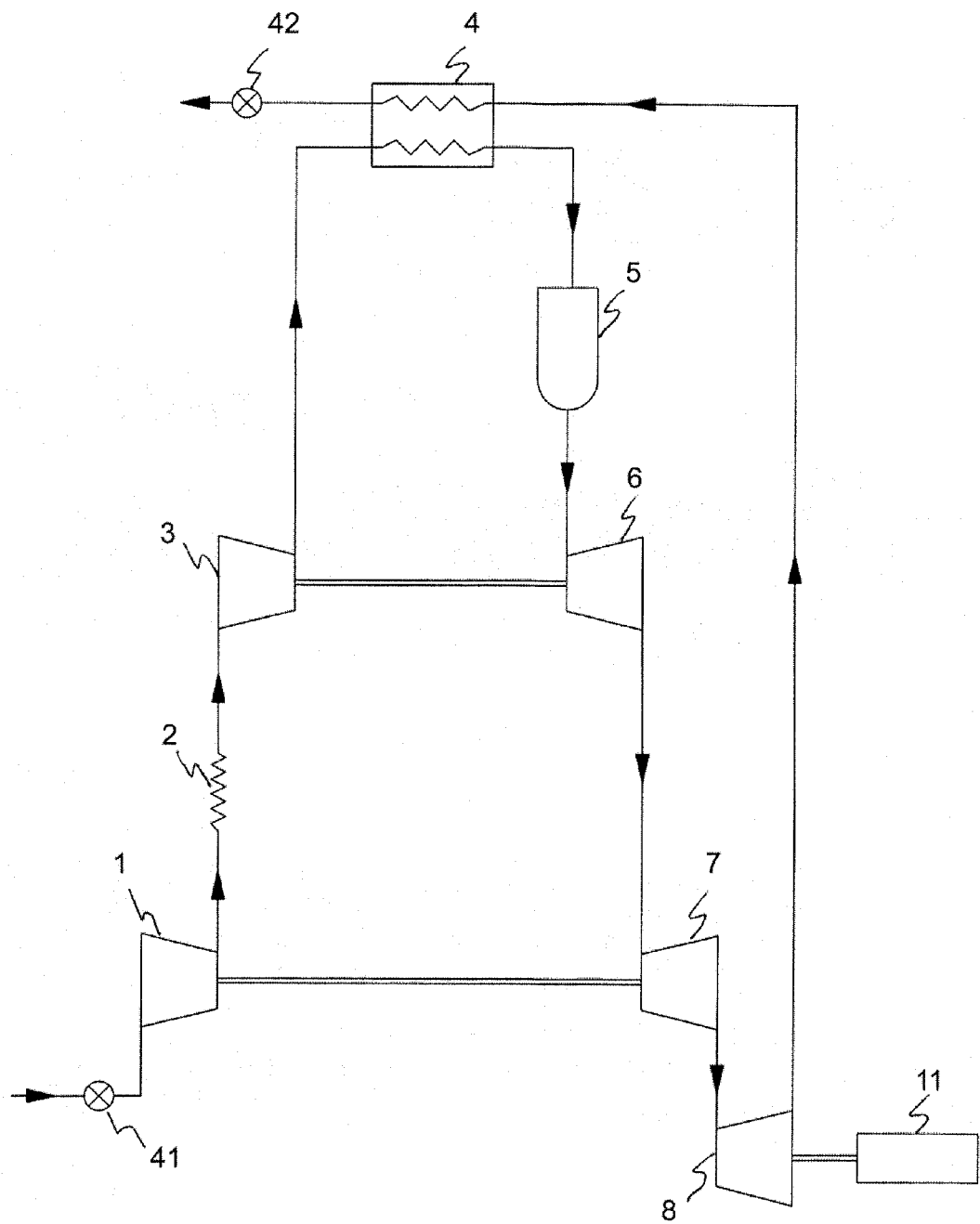
FIG. 1 is prior art schematic of the component architecture of a multi-spool gas turbine engine.

FIG. 1 is prior art schematic of the component architecture of a multi-spool gas turbine engine. Gas is ingested into a low pressure compressor 1. The outlet of the low pressure compressor 1 passes through an intercooler 2 which removes a portion of heat from the gas stream at approximately constant pressure. The gas then enters a high pressure compressor 3. The outlet of high pressure compressor 3 passes through a recuperator 4 where some heat from the exhaust gas is transferred, at approximately constant pressure, to the gas flow from the high pressure compressor 3. The further heated gas from recuperator 4 is then directed to a combustor 5 where a fuel is burned, adding heat energy to the gas flow at approximately constant pressure. The gas emerging from the combustor 5 then enters a high pressure turbine 6 where work is done by the turbine to operate the high pressure compressor 3. The gas exiting from the high pressure turbine 6 then enters a low pressure turbine 7 where work is done by the turbine to operate the low pressure compressor 1. The gas exiting from the low pressure turbine 7 then enters a free power turbine 8. The shaft of the free power turbine, in turn, drives a transmission 11 which may be an electrical, mechanical or hybrid transmission for a vehicle. Alternately, the shaft of the free power turbine can drive an electrical generator or alternator. This engine design is described, for example, in U.S. patent application Ser. No. 12/115,134 filed May 5, 2008, entitled "Multi-Spool Intercooled Recuperated Gas Turbine", which is incorporated herein by this reference.

As can be appreciated, the engine illustrated in FIG. 1 can have additional components (such as for example a re-heater between the high pressure and low pressure turbines) or can have fewer components (such as for example a single compressor-turbine spool, or no free power turbine but shaft power coming off the low pressure turbine spool).

A gas turbine engine is an enabling engine for efficient multi-fuel use and, in particular, this engine can be configured to switch between fuels while the engine is running and the vehicle is in motion (on the fly). In addition, a gas turbine engine can be configured to switch on the fly between liquid and gaseous fuels or operate on combinations of these fuels. This is possible because combustion in a gas turbine engine is continuous (as opposed to episodic such as in a reciprocating piston engine) and the important fuel parameter is the specific energy content of the fuel (that is, energy per unit mass) not its cetane number or octane rating. The cetane number (typically for diesel fuels and compression ignition) or octane rating (typically for gasoline fuels and spark ignition) are important parameters in piston engines for specifying fuel ignition properties.

Figure 2:
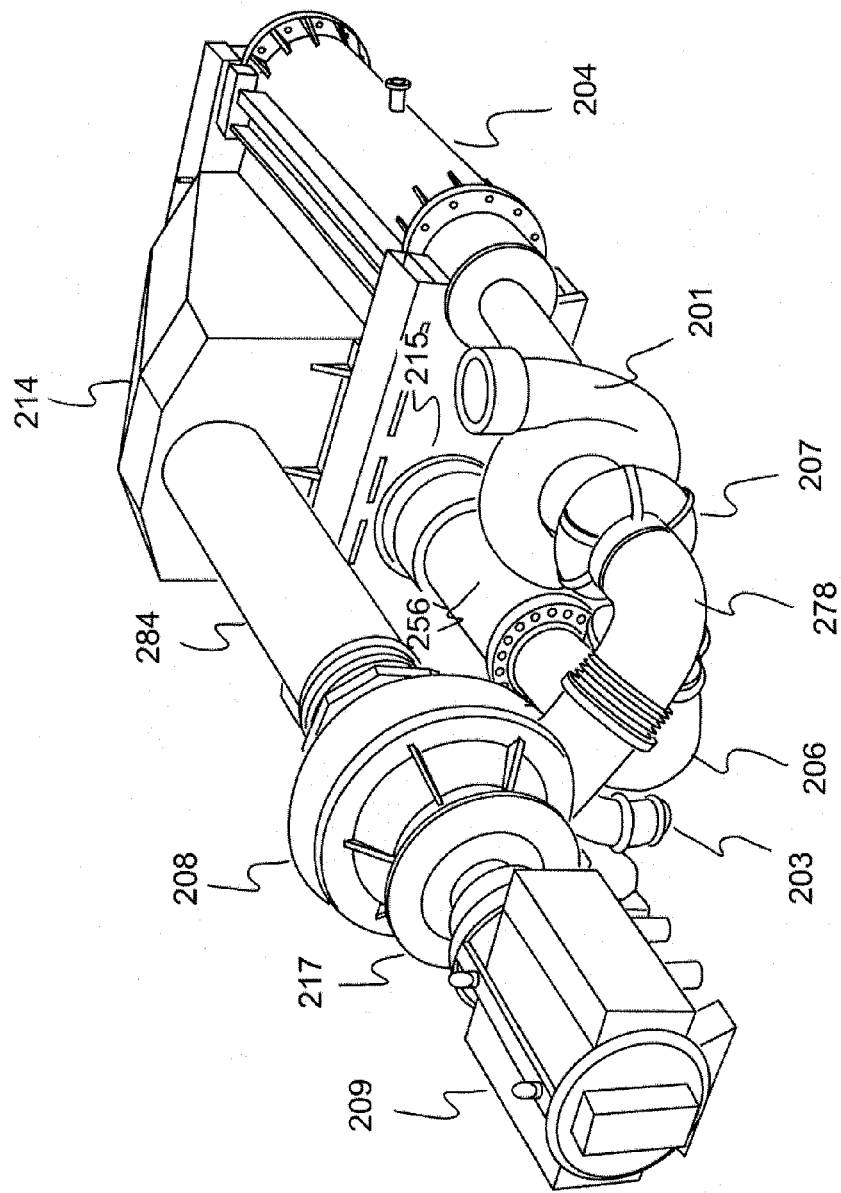
FIG. 2 is a line drawing of a gas turbine suitable for long haul trucks. This is prior art.

The gas turbine engine such as shown schematically in FIG. 2 enables a multi-fuel strategy. This engine is prior art although even more efficient multi-fuel configurations will require innovative modifications to components and sub-components. This is an example of a 375 kW engine that uses intercooling and recuperation to achieve high operating efficiencies (40% or more) over a substantial range of vehicle operating speeds. This compact engine is suitable for light to heavy trucks. Variations of this engine design are suitable for smaller vehicles as well as applications such as, for example, marine, rail, agricultural and power-generation. One of the principal features of this engine is its fuel flexibility and fuel tolerance. This engine can operate on any number of liquid fuels (gasoline, diesel, ethanol, methanol, butanol, alcohol, bio diesel and the like) and on any number of gaseous fuels (compressed or liquid natural gas, propane, hydrogen and the like). This engine may also be operated on a combination of fuels such as mixtures of gasoline and diesel or mixtures of diesel and natural gas. Switching between these fuels is generally a matter of switching fuel injection systems and/or fuel mixtures.

This engine operates on the Brayton cycle and, because combustion is continuous, the peak operating temperatures are substantially lower than comparably sized piston engines operating on either an Otto cycle or Diesel cycle. This lower peak operating temperature results in substantially less NOx emissions generated by the gas turbine engine shown in FIG. 2. This figure shows a load device 209, such as for example a high speed alternator, attached via a reducing gearbox 217 to the output shaft of a free power turbine 208. A cylindrical duct 284 delivers the exhaust from free power turbine 208 to a plenum 214 which channels exhaust through the hot side of recuperator 204. Low pressure compressor 201 receives its inlet air via a duct (not shown) and sends compressed inlet flow to an intercooler (also not shown). The flow from the intercooler is sent to high pressure compressor 203 which is partially visible underneath free power turbine 208. As described previously, the compressed flow from high pressure compressor 203 is sent to the cold side of recuperator 204 and then to a combustor which is contained inside recuperator 204. The flow from combustor 215 (whose outlet end is just visible) is delivered to high pressure turbine 206 via cylindrical duct 256. The flow from high pressure turbine 206 is directed through low pressure turbine 207. The expanded flow from low pressure turbine 207 is then delivered to free power turbine 208 via a cylindrical elbow 278.

This engine has a relatively flat efficiency curve over wide operating range (from about 20% of full power to about 85% of full power). It also has a multi-fuel capability with the ability to change fuels on the fly as described in U.S. patent application Ser. No. 13/090,104 filed Apr. 19, 2011 entitled "Multi-Fuel Vehicle Strategy" which is incorporated herein by reference.

Ceramics Used in Gas Turbines

Figure 3:
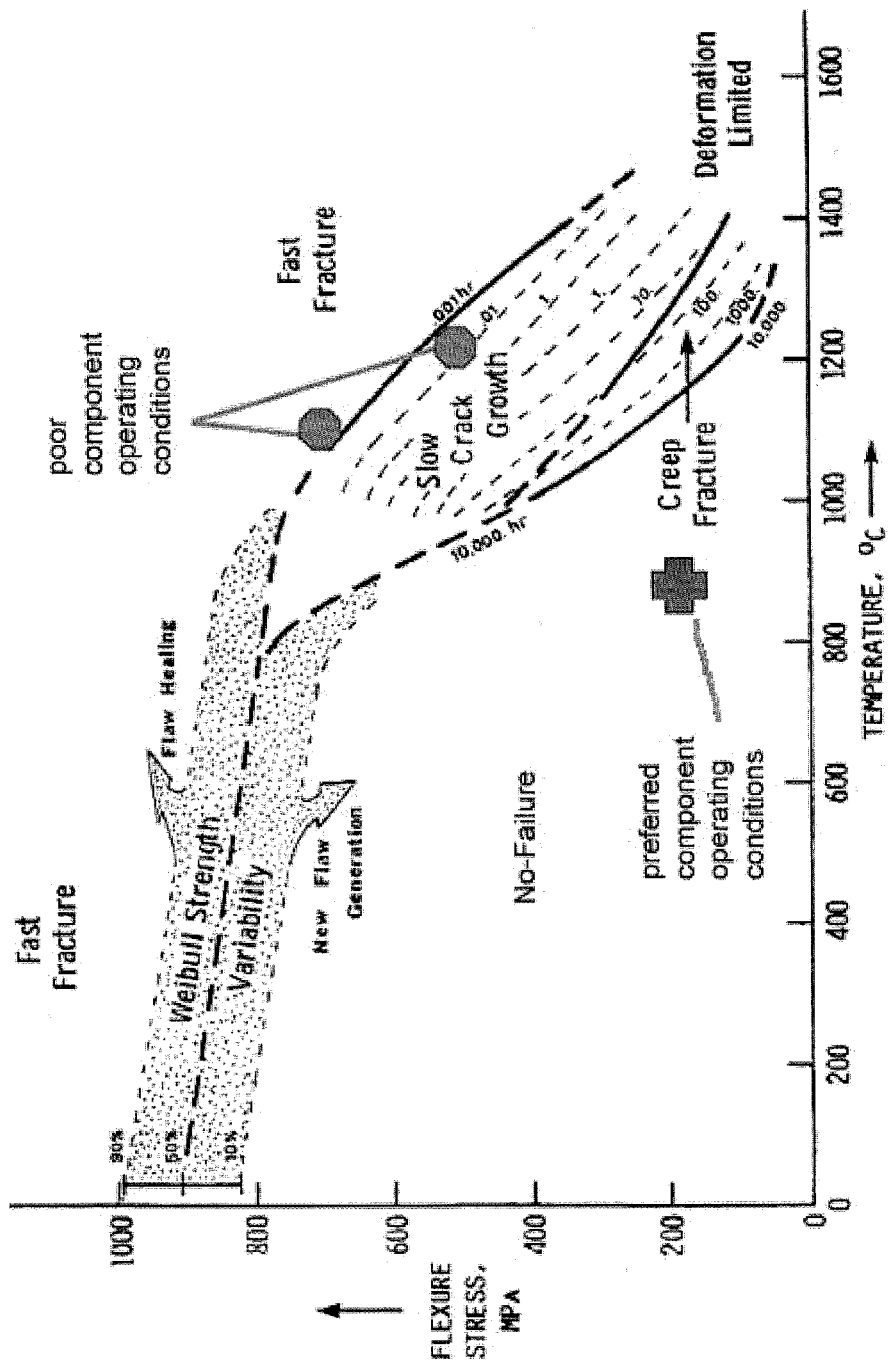
FIG. 3 is a stress-temperature map showing ceramic failure regimes.

FIG. 3 is a stress-temperature map illustrating failure regimes for typical ceramic materials. This graphic shows that when flexure stress and temperature experienced by a ceramic component are high, the component operates in the fast fracture regime and the ceramic component lifetime would be expected to be unpredictable and typically short. This graphic also shows that when flexure stress and temperature experienced by a ceramic component are low, then the component operates in the no-failure regime and the ceramic component lifetime would be expected to be predictable and typically long. When the flexure stress is high but the temperature is low, then the component operates in a regime characterized by Weibull strength variability. When the flexure stress is low but the temperature is high, then the component operates in a regime characterized by slow crack growth or creep and the ceramic component lifetime would be expected to be somewhat unpredictable and variable.

Some gas turbine engines, especially microturbines, have used ceramic components in prototype situations. These have been used for relatively high temperatures and operated in the slow crack growth region. These engines have experienced failure of the ceramic components. One of the design goals used in the present disclosure is to maintain ceramic component operation well inside the no-failure regime so that incidences of component failure are substantially minimized and component lifetime is substantially maximized. A number of turbochargers have used ceramic components operating in the no-failure region, most notably ceramic rotors.

The following table shows some important properties of ceramics that are typically used for gas turbine components.

TABLE 1

|  | Alumina | Cordierite | Silicon Carbide | Silicon Nitride | Mullite |
| --- | --- | --- | --- | --- | --- |
| Density (kg/m3) | 3,700-3,970 | 2,600 | 3,210 | 3,310 | 2,800 |
| Specific Heat (J/kg/K) | 670 | 1,465 | 628 | 712 | 963 |
| Thermal Conductivity (W/m/K) | 24 | 3 | 41 | 27 | 3.5 |
| Coefficient Thermal Expansion (µm/m/K) | 8.39 | 1.7 | 5.12 | 3.14 | 5.3 |
| Thermal Shock Resistance (ΔT (K)) | 200-250 | 500 | 350-500 | 750 | 300 |

TABLE 1-continued

| | Alumina | Cordierite | Silicon Carbide | Silicon Nitride | Mullite |
|---|---|---|---|---|---|
| Maximum Use Temperature (K) | 3,925 | 1,645 | 1,675 | 1,775 | 1,975 |

Figure 4:
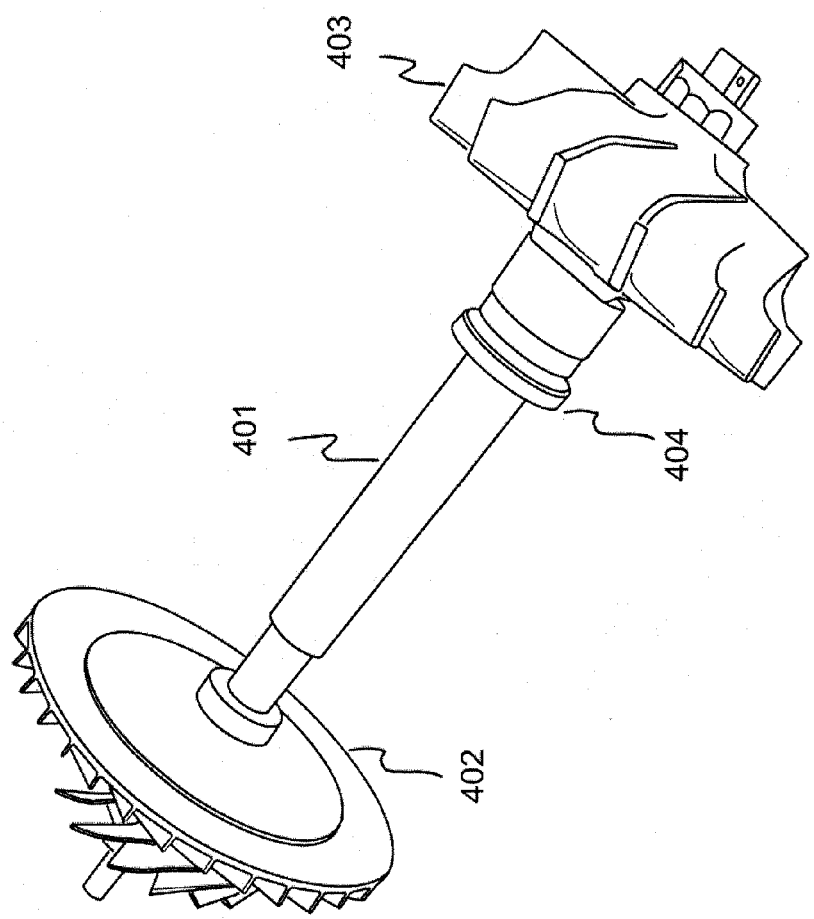
FIG. 4 is a schematic of a prior art turbo-compressor spool showing a metallic compressor rotor and a ceramic turbine rotor.

FIG. 4 is a schematic of a prior art turbo-compressor spool showing a metallic compressor rotor and a ceramic turbine rotor. This figure illustrates a compressor/turbine spool typical of use in a high-efficiency gas turbine operating in the output power range of about 300 to about 750 kW. A metallic compressor rotor 402 and a ceramic turbine rotor 403 are shown attached to the opposite ends of a metal shaft 401. The ceramic rotor shown here is a 95-mm diameter rotor fabricated from silicon nitride and was originally designed for use in turbocharger applications. As can be seen, the joint 404 between the ceramic rotor and metallic shaft is close to the ceramic rotor and is therefor exposed to high temperatures of the combustion products passing through the turbine. As can be seen, the joint 404 between the ceramic rotor and metallic shaft is close to the ceramic rotor and would typically be between the leftmost oil bearing and the ceramic rotor. The joint 404 is formed by inserting the ceramic shaft stub into a counterbore in the metallic shaft. The joint 404 is about 20 to about 25 mm from the ceramic rotor and is therefore exposed to high temperatures of the gas products passing through the turbine. Typical turbine inlet temperatures for this design are in the range of about 1,250° K to about 1,400° K.

Figure 5:
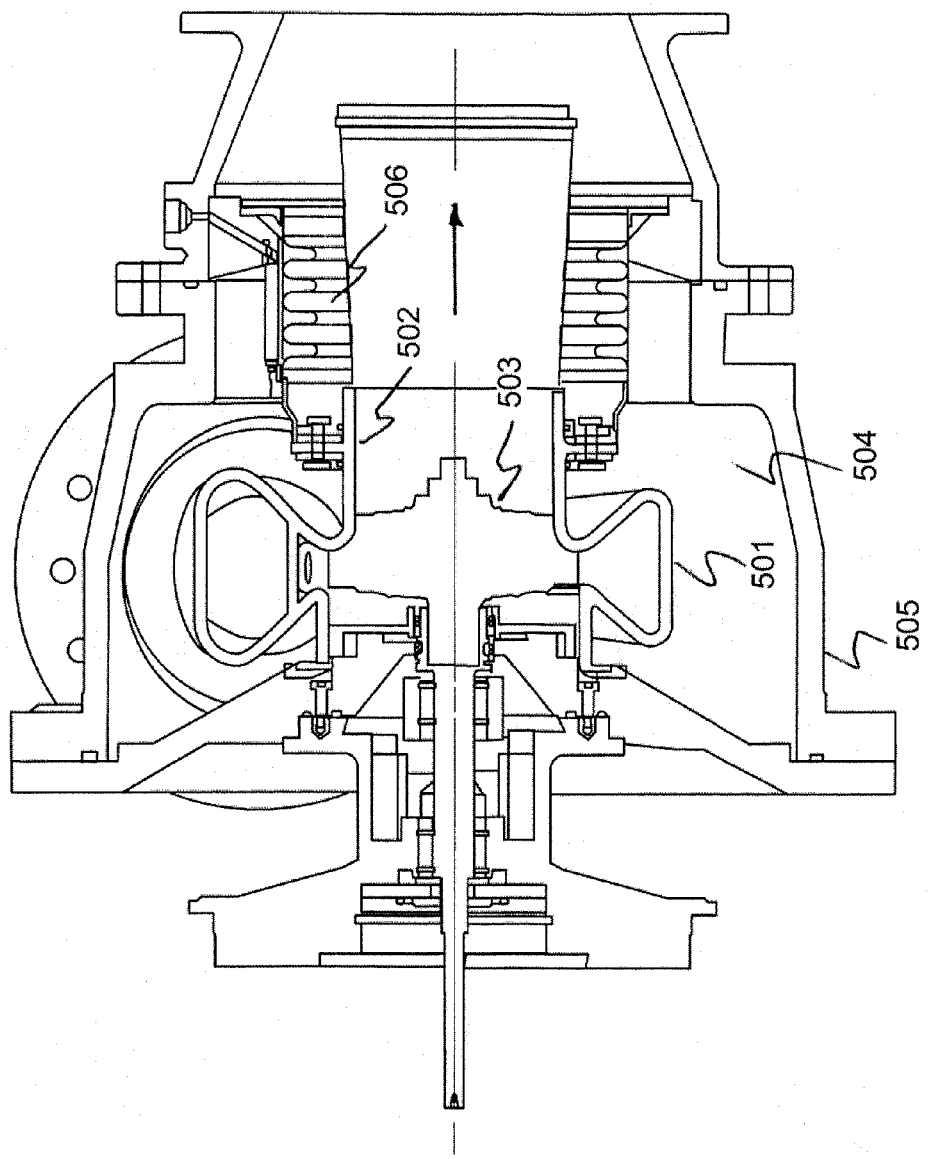
FIG. 5 is a schematic of a prior art gas turbine compressor/turbine spool comprising a ceramic rotor, volute and shroud.

FIG. 5 is schematic of a prior art gas turbine compressor/turbine spool assembly with ceramic and metallic components. This figure was taken from U.S. patent application Ser. No. 13/180,275 entitled "Metallic Ceramic Spool for a Gas Turbine Engine" filed Jul. 11, 2011 which is incorporated herein by reference. FIG. 5 illustrates a turbo-compressor spool with an all-ceramic high pressure turbine section. A ceramic turbine rotor 503 is shown separated by a small clearance gap from a ceramic shroud 502 which is integral with a ceramic volute 501. The volute, shroud and rotor are housed inside a metal case 504. The ceramic shroud 502 is also attached to a compliant metallic bellows 506 which is attached to an outer metal case 505. This configuration is capable of operating safely at turbine inlet temperatures in the approximate range from about 850° K to about 1,400° K. The ceramic rotor may be fabricated from rotor fabricated from silicon nitride. The ceramic shroud and volute can be fabricated from silicon carbide, for example, which has a coefficient of thermal expansion similar to that of silicon nitride used for the rotor. The use of a rotor and volute/shroud fabricated from the same or similar ceramics adequately thus controls radial and axial shroud clearances between the rotor 503 and shroud 502 and maintains high rotor efficiency by controlling the clearance and minimizing parasitic flow leakages between the rotor blade tips and the shroud. This design of a single piece or two piece ceramic volute and shroud for use with a ceramic turbine rotor is preferred if the ceramic material used can be operated well within the no-failure region as shown in FIG. 3. U.S. patent application Ser. No. 13/180,275 also describes a turbo-compressor spool comprised of ceramic and metallic components and with an active clearance control system.

Present Disclosure

The ceramic-to-metal attachment joint represents an important feature that, if not designed properly, limits the allowable operating temperature of the turbine rotor. Most joints of this type are limited to operating temperatures below 800° K. The drive for increased efficiency is pushing the rotor temperatures to levels approaching 1,400° K and higher. In the prior art, this ceramic-to-metal attachment is typically located close to the turbine rotor (see FIG. 4 for example), thus aggressive cooling is required to maintain the allowable temperature. The steep thermal gradient creates an area of elevated thermal stress.

Moving the temperature-limited joint between the bearings lowers its temperature and reduces the sharp gradient (and associated thermal stress) which naturally occurs between the turbine rotor and the cooler joint. A large outside diameter bearing is required on the turbine side so that it can be assembled. It is also anticipated that the ceramic turbine stub shaft needs to be relatively large in diameter relative to the metallic portion of the shaft to have the proper stiffness.

In the embodiments described herein, one or more of the following configurations are employed:
1. Relocation of the ceramic-metallic joint substantially further away from the hot turbine gases to substantially reduce the thermal gradient and the thermal stress on the joint.
2. Relocating the joint on the other side of the bearing closest to the turbine.
3. Increasing the length and diameter of the ceramic shaft that is an integral part of the ceramic rotor and using a short, smooth transition down to the diameter of the metallic shaft.
4. In place of the ceramic shaft being inserted into a counterbore in the metallic shaft, the diameter of the ceramic and metallic shaft is made the same. Brazing and the use of a connecting sleeve are used to form a strong joint with the required stiffness and ability to transmit the required torque.
5. Relocating the joint so that either an all-oil bearing; an all-air bearing; or a combination air and oil bearing system can be used.

Consider the joint re-design in terms of the stress-temperature map of FIG. 3 which illustrates ceramic failure regimes. In the prior art joint, flexure stress and temperature experienced by the ceramic material in the vicinity of the joint are relatively high and the ceramic material operates near the creep fracture regime where ceramic component lifetime would tend to be somewhat unpredictable and variable. By moving the joint away from the turbine rotor thereby lowering the temperature at the joint, flexure stress would increase and the net result is that the ceramic material near the joint would remain near the creep fracture region and begin to approach the region characterized by Weibull strength variability. By increasing the ceramic shaft diameter and utilizing a sleeve to stiffen the joint, the flexure stress is reduced while temperature is maintained at its lower value. This places the ceramic joint material well within the no-failure regime and the lifetime of the ceramic material around the joint would be expected to be predictable and typically long.

As the turbine inlet temperature is increased over time as part of continued product improvement, the ceramic material in the vicinity of the joint should remain well within the no-failure zone of flexure stress versus temperature. Therefore the present disclosure not only solves a near term problem but is robust enough to maintain a long lifetime for the ceramic material in the vicinity of the metallic-ceramic joint.

Figure 6:
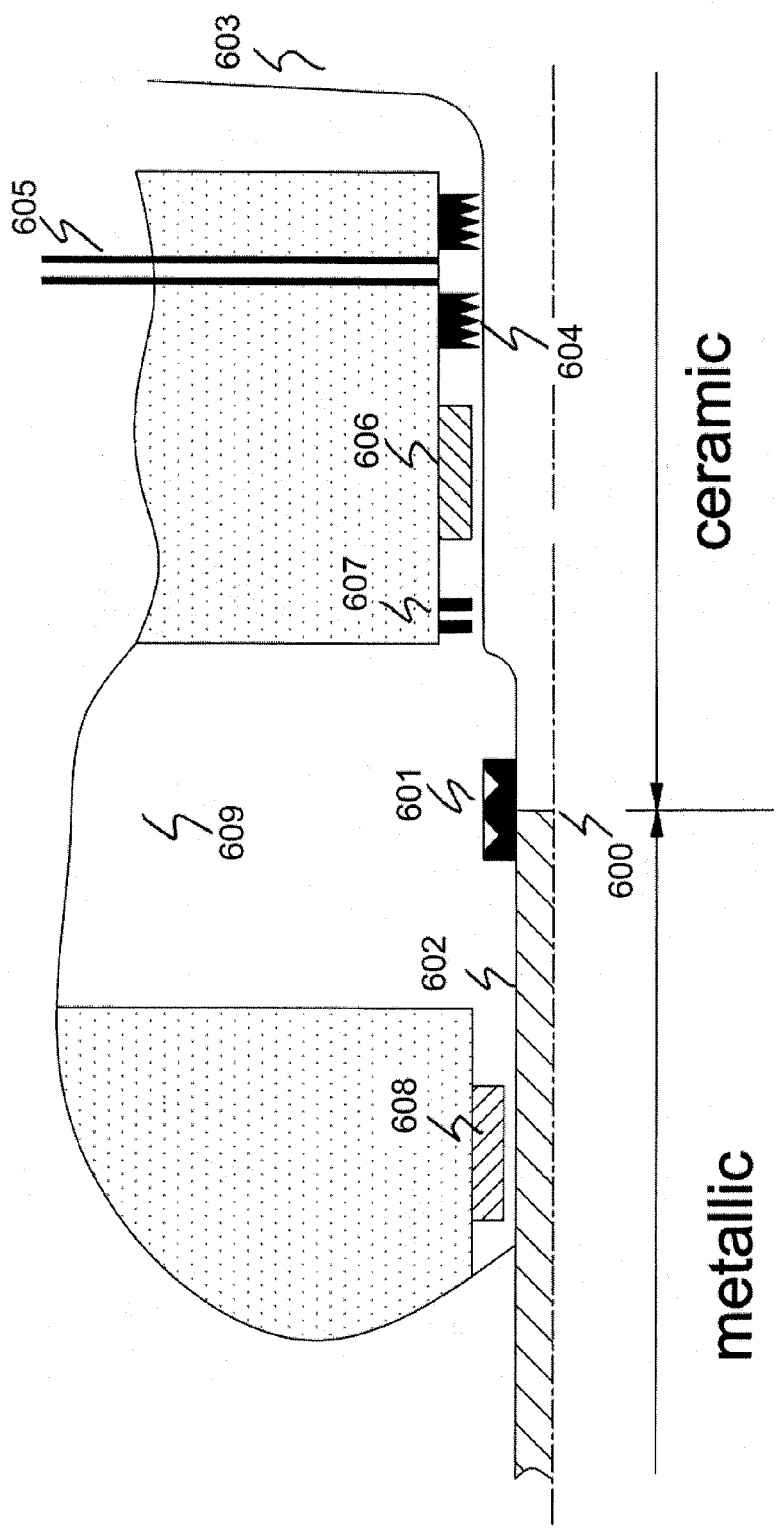
FIG. 6 shows a general configuration of an air and oil hybrid bearing system with a ceramic-to-metal attachment joint of the present disclosure.

FIG. 6 shows a general configuration of an air and oil hybrid bearing system with a ceramic-to-metal attachment joint 600 of the present disclosure. The ceramic-to-metal joint 600 is shown positioned approximately mid-way between the compressor rotor (not shown) and turbine rotor 603 and between an oil bearing 608 on the compressor side and an air bearing 606 on the turbine side. A coupler sleeve 601 is shown around joint 600 between the ceramic and the metallic shaft 602. The ceramic shaft is also part of the ceramic rotor 603 and is typically made from silicon nitride, silicon carbide, alumina or the like. The metallic shaft is typically fabricated from a high strength, high temperature steel such as for example a stainless steel or an Inconel steel. The metallic portion of the shaft may also be made from other metals such as titanium and even a high strength-high temperature aluminum. The metallic shaft 602 is the same diameter as the end of the ceramic shaft and the ceramic shaft transitions smoothly o a larger diameter to improve shaft stiffness. The ceramic and metallic shafts are typically brazed together to form a strong joint 600. The coupler sleeve 601 may also be brazed to the outer surface of the metallic and ceramic shafts. The coupler sleeve 601 is typically made from a high strength, high temperature steel such as for example a stainless or an Inconel steel. In the configuration of FIG. 6, the compressor-side bearing 608 is an oil bearing where oil is forced between the oil bearing and the metallic shaft during operation. Region 609 is filled with an oil mist. The turbine-side bearing 606 is an air bearing where air, typically bled from the compressor air flow, is directed between two labyrinth seals 604 and forced between the air bearing and the ceramic shaft during operation. The compressor bleed 605 is approximately about 2% of the total air flow through its corresponding compressor. The air and oil are separated by a discourager 607. In FIG. 6, the ceramic/metallic joint 600 is about 75 mm from the 95-mm diameter turbine rotor and is about 3 to about 4 times as far away from the turbine rotor as the prior art joint shown in FIG. 4.

Figure 7:
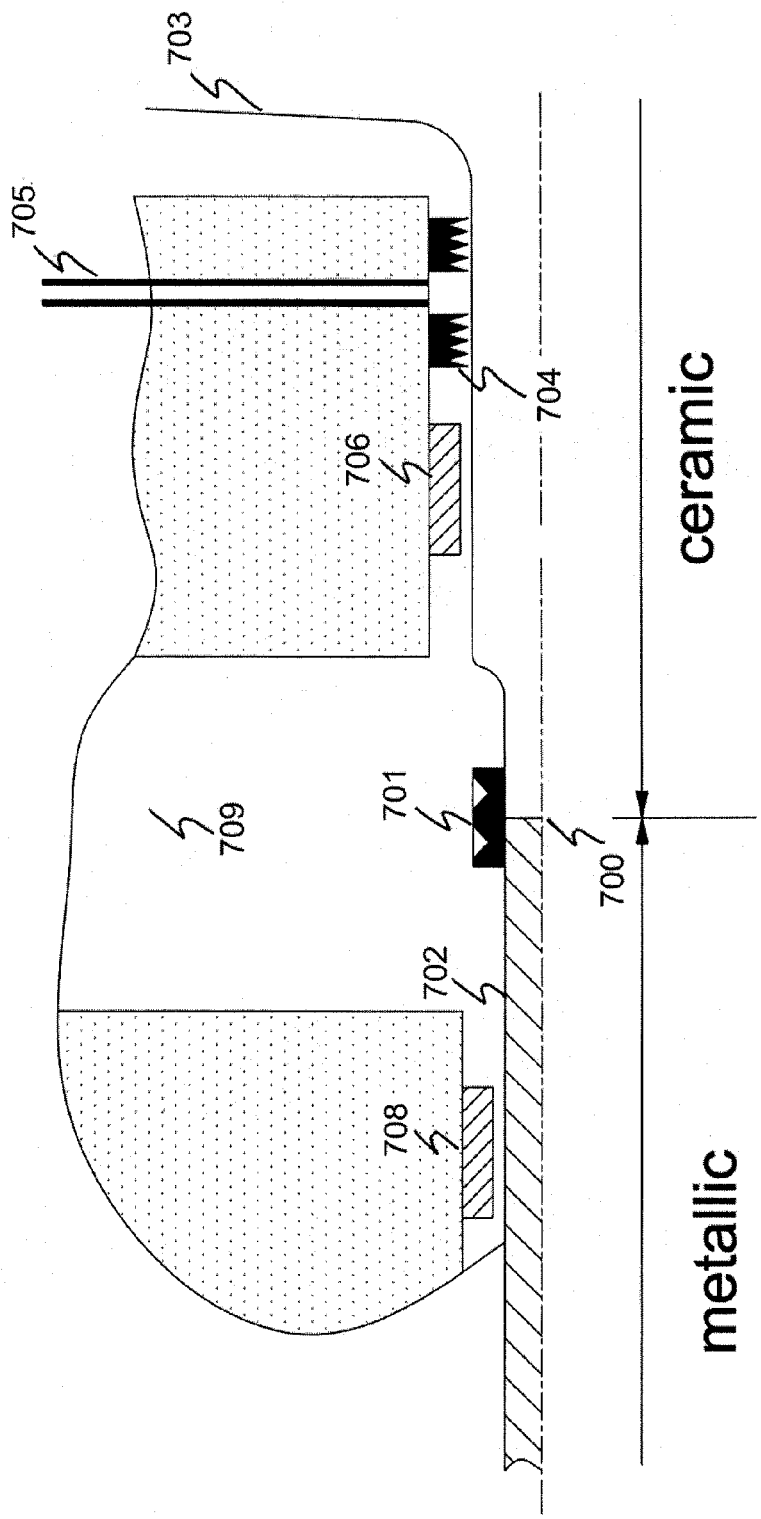
FIG. 7 shows a general configuration of an all-oil bearing system with a ceramic-to-metal attachment joint of the present disclosure.

FIG. 7 shows a general configuration of an all-oil bearing system with a ceramic-to-metal attachment joint 700 of the present invention. The ceramic-to-metal joint 700 is shown positioned approximately mid-way between the compressor rotor (not shown) and turbine rotor 703 and between an oil bearing 708 on the compressor side and a larger split oil bearing 706 on the turbine side. This latter bearing may be split for assembly. A coupler sleeve 701 is shown around joint 700 between the ceramic and the metallic shafts. The metallic shaft 702 is the same diameter as the end of the ceramic shaft and the ceramic shaft transitions to a larger diameter to improve shaft stiffness. In the configuration of FIG. 7, the compressor-side bearing 708 is an oil bearing where oil is forced between the oil bearing 708 and the metallic shaft 702 during operation. Region 709 is filled with an oil mist. The turbine-side bearing 706 is also an oil bearing where oil is forced between the oil bearing and the ceramic shaft during operation. Air is typically bled from the compressor air flow and directed between two labyrinth seals 704 and helps prevent oil from leaking into the turbine rotor air flow. In FIG. 7, the ceramic/metallic joint 700 is about 75 mm from the 95-mm diameter turbine rotor and is about 3 to about 4 times as far away from the turbine rotor as the prior art joint shown in FIG. 4.

Figure 8:
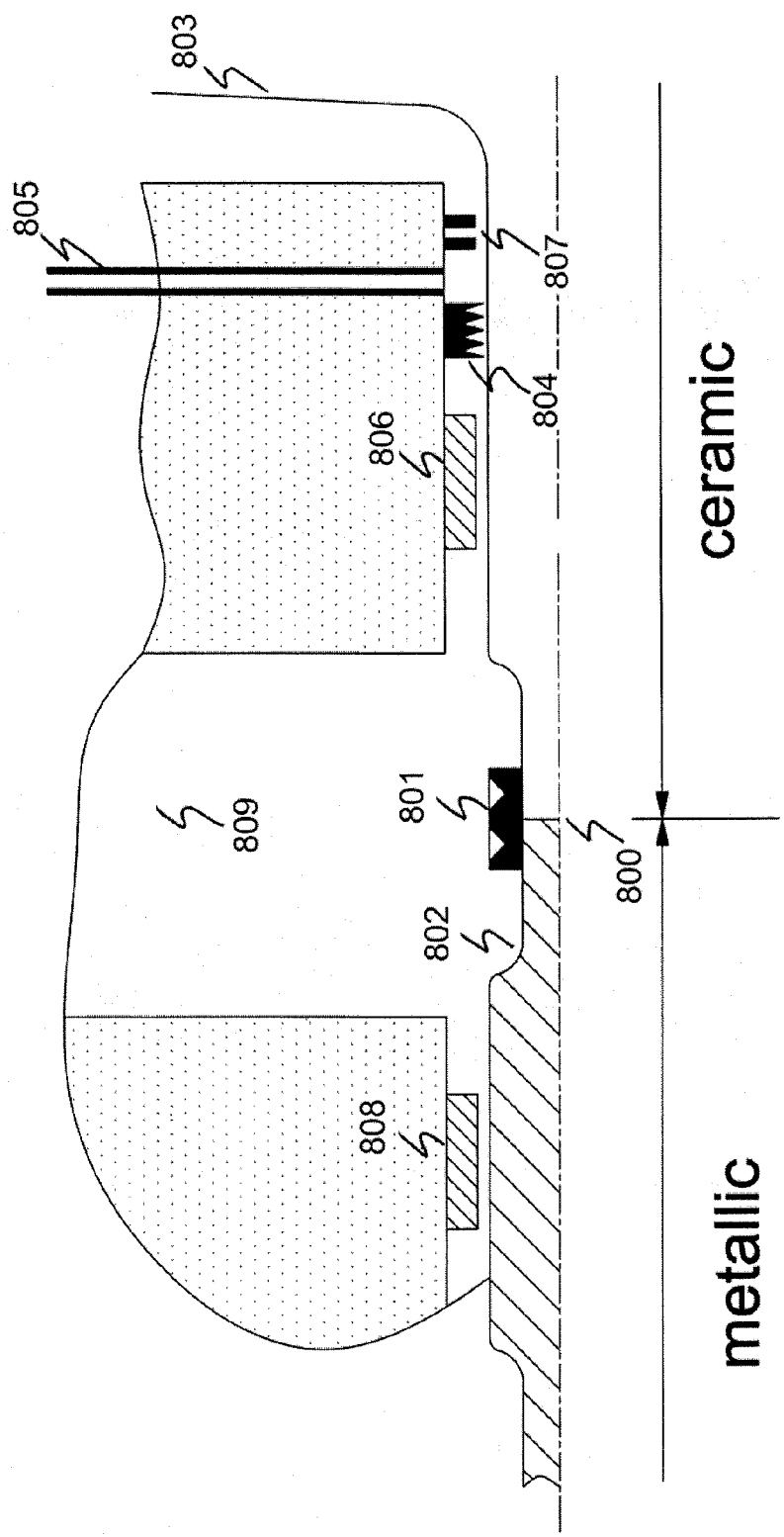
FIG. 8 shows a general configuration of an all-air bearing system with a ceramic-to-metal attachment joint of the present disclosure.

FIG. 8 shows a general configuration of an all-air bearing system with a ceramic-to-metal attachment joint 800 of the present disclosure. The ceramic-to-metal joint 800 is shown positioned approximately mid-way between the compressor rotor (not shown) and turbine rotor 803 and between an air bearing 808 on the compressor side and a similar sized air bearing 806 on the turbine side. One or both bearings may be split for assembly. As shown in FIG. 8, the metallic shaft 802 has a large diameter section so that the two air bearings can be the same component. A coupler sleeve 801 is shown around the joint 800 between the ceramic and the metallic shafts. The metallic shaft 802 is the same diameter as the end of the ceramic shaft and the ceramic shaft transitions to a larger diameter to improve shaft stiffness. In the configuration of FIG. 8, the compressor-side bearing 808 is an air bearing where air is forced between the air bearing and the metallic shaft 802 during operation. The turbine-side bearing 806 is also an air bearing where air is forced between the air bearing and the ceramic shaft during operation. Air is typically bled from the compressor air flow and directed between a labyrinth seal 804 and a discourager 807. In FIG. 8, the ceramic/metallic joint 800 is about 75 mm from the 95-mm diameter turbine rotor and is about 3 to about 4 times as far away from the turbine rotor as the prior art joint shown in FIG. 4. Moving the joint to about halfway between the air bearings 806 and 808 is anticipated to provide sufficient isolation to enable this all-air bearing solution.

The disclosure has been described with reference to the preferred embodiments. Modifications and alterations will occur to others upon a reading and understanding of the preceding detailed description. It is intended that the disclosure be construed as including all such modifications and alterations insofar as they come within the scope of the appended claims or the equivalents thereof.

A number of variations and modifications of the disclosures can be used. As will be appreciated, it would be possible to provide for some features of the disclosures without providing others.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An engine, comprising:
    a plurality of turbo-compressor spool assemblies, each turbo-compressor spool assembly comprising a compressor and a turbine attached by a common shaft and a first of the turbo-compressor spool assemblies is in fluid communication with a second of the turbo-compressor spool assemblies, at least one of the common shafts of a selected turbo-compressor spool assembly comprising a metallic compressor rotor and a ceramic turbine rotor connected by a metallic-to-ceramic attachment joint and a first bearing being positioned adjacent to the metallic compressor rotor and a second bearing adjacent to the ceramic turbine rotor;
    a free power turbine driven by a gas flow output by at least one of the turbo-compressor assemblies; and
    a combustor operable to combust a fuel and a gas output by one of the plurality of turbo-compressor spool assemblies, wherein:
    when the engine is in operation, the ceramic turbine rotor of the selected turbo-compressor spool assembly operates in a no-failure regime of the ceramic material;
    the ceramic-to-metallic attachment joint is located on the common shaft of the selected turbo-compressor spool assembly to be in a no-failure regime of the ceramic material, the location of the metallic-to-ceramic attachment joint being positioned between the first and second bearings on the common shaft, and
    when the engine is in operation, the metallic-to-ceramic attachment joint operates at a temperature of no more than about 800° K.

2. The engine of claim 1, wherein the turbine rotor of the selected turbo-compressor spool assembly operates at a temperature of at least about 1,200° K.

3. The engine of claim 1, wherein the first bearing is an oil bearing and the second bearing is an air bearing, and wherein at least one of the following is true:
    (i) the air and oil are substantially separated by a discourager; and
    (ii) the air bearing has a larger inside diameter than the oil bearing.

4. The engine of claim 1, wherein the first bearing is an air bearing and the second bearing is an oil bearing.

5. The engine of claim 1, wherein the first and second bearings are air bearings and wherein at least a portion of the air in the air bearing is removed from a gas flow of the compressor of the selected turbo-compressor spool assembly.

6. The engine of claim 5, wherein the air is directed between a labyrinth seal and a discourager and the common shaft.

7. The engine of claim 1, wherein the first and second bearings are oil bearings.

8. The engine of claim 7, wherein air is bled from a compressor air flow and is directed between two labyrinth seals and the common shaft to inhibit oil from leaking into a turbine rotor air flow.

9. The engine of claim 1, wherein a ceramic portion of the common shaft of the selected turbo-compressor spool assembly is at least about 40% of a length of the corresponding common shaft.

10. The engine of claim 1, wherein an outer diameter of a ceramic portion of the common shaft of the selected turbo-compressor spool assembly is substantially the same as an outer diameter of a metallic portion of the common shaft at the joint and wherein the metallic-to-ceramic attachment joint is brazed and comprises a connecting sleeve.

11. The engine of claim 1, wherein an outer diameter of the ceramic portion increases by at least about 20% in proximity to the ceramic turbine rotor while the metallic portion remains substantially constant between the metallic-to-ceramic joint and the metallic compressor rotor.

12. An engine, comprising:
    a plurality of turbo-compressor spool assemblies, each turbo-compressor spool assembly comprising a compressor and a turbine attached by a common shaft and a first of the turbo-compressor spool assemblies is in fluid communication with a second of the turbo-compressor spool assemblies;
    a free power turbine driven by a gas flow output by at least one of the turbo-compressor assemblies; and
    a combustor operable to combust a fuel and a gas output by one of the plurality of turbo-compressor spool assemblies, wherein a selected turbo-compressor spool assembly comprises a metallic compressor rotor and a ceramic turbine rotor connected by a metallic-to-ceramic attachment joint, wherein a first and second bearings are located along a common shaft of the selected turbo-compressor spool assembly, and wherein at least one of the following is true:
    (i) a turbine rotor of a selected turbo-compressor spool assembly operates in a no-failure regime of the ceramic material and the metallic-to-ceramic attachment joint is located to be in a no-failure regime of the ceramic material;
    (ii) the metallic-to-ceramic attachment joint is located between the first and second bearings;
    (iii) a ceramic portion of the common shaft has a length of at least about 40% of a length of the shaft; and
    (iv) respective diameters of the ceramic portion and a metallic portion of the common shaft are substantially the same in the vicinity of the metallic-to-ceramic attachment joint.

13. The engine of claim 12, wherein (i) is true.

14. The engine of claim 12, wherein (ii) is true.

15. The engine of claim 12, wherein (iii) is true and wherein an outer diameter of a ceramic portion of the common shaft of the selected turbo-compressor spool assembly is substantially the same as an outer diameter of a metallic portion of the common shaft at the joint.

16. The engine of claim 12, wherein (iv) is true.

17. A method, comprising:
    providing a gas turbine engine, the gas turbine engine comprising a turbo-compressor spool assembly, the turbo-compressor spool assembly comprising a compressor and a turbine attached by a common shaft, a free power turbine driven by a gas flow output by the turbo-compressor assembly, and a combustor operable to combust a fuel and a gas output by the turbo-compressor spool assembly, the compressor comprising a metallic compressor rotor and the turbine comprising a ceramic turbine rotor connected by a metallic-to-ceramic attachment joint; and
    when the gas turbine engine is in operation, maintaining the turbine rotor and the metallic-to-ceramic attachment joint in a no-failure regime of the ceramic material.

18. The method of claim 17, wherein the turbine of the turbo-compressor spool assembly operates at a temperature of at least about 1,200° K and wherein the metallic-to-ceramic attachment joint operates at a temperature of no more than about 800° K.

19. The method of claim 17, wherein a first bearing is positioned adjacent to the metallic compressor rotor and a second bearing is positioned adjacent to the ceramic turbine rotor and wherein the ceramic-to-metallic attachment joint is positioned between first and second bearings on the common shaft of the turbo-compressor spool assembly.

20. The method of claim 19, wherein the first bearing is an oil bearing and the second bearing is an air bearing and wherein the air and oil are substantially separated by a discourager.

21. The method of claim 19, wherein the first bearing is an air bearing and the second bearing is an oil bearing.

22. The method of claim 19, wherein the first and second bearings are air bearings and wherein at least a portion of the air in the air bearing is removed from a gas flow of the compressor of the turbo-compressor spool assembly.

23. The method of claim 22, wherein the air is directed between a labyrinth seal and a discourager and the common shaft.

24. The method of claim 19, wherein the first and second bearings are oil bearings.

25. The method of claim 24, wherein air is bled from a compressor air flow and is directed between two labyrinth seals and the common shaft to inhibit oil from leaking into a turbine rotor air flow.

26. The method of claim 17, wherein a ceramic portion of the common shaft of the turbo-compressor spool assembly is at least about 40% of a length of the common shaft.

27. The method of claim 17, wherein an outer diameter of a ceramic portion of the common shaft of the selected turbo-compressor spool assembly is substantially the same as an outer diameter of a metallic portion of the common shaft at the joint and wherein the metallic-to-ceramic attachment joint is brazed and comprises a connecting sleeve.

28. The method of claim 26, wherein an outer diameter of the ceramic portion increases by at least about 25% in proximity to the ceramic turbine rotor while the metallic portion remains substantially constant between the metallic-to-ceramic joint and the metallic compressor rotor.

* * * * *